United States Patent Office 3,803,120
Patented Apr. 9, 1974

3,803,120
DI- AND TRIPEPTIDES OF 3-(3,4-DIHYDROXY-PHENYL)-ALANINE
Arthur Martin Felix, West Caldwell, N.J., assignor to Hoffmann-La Roche Inc., Nutley, N.J.
No Drawing. Continuation-in-part of application Ser. No. 184,614, Sept. 28, 1971, which is a continuation-in-part of application Ser. No. 85,713, Oct. 30, 1970, both now abandoned. This application Apr. 12, 1972, Ser. No. 243,442
Int. Cl. C07c *101/72, 103/52*
U.S. Cl. 260—112.5
57 Claims

ABSTRACT OF THE DISCLOSURE

Tri- and di-peptides of 3-(3,4-dihydroxyphenyl)-alanine and an α-amino acid or dopamine which are useful as anti-Parkinson agents.

CROSS REFERENCE TO RELATED APPLICATIONS

This application is a continuation-in-part of U.S. patent application Ser. No. 184,614, filed on Sept. 28, 1971, now abandoned which in turn is a continuation-in-part of U.S. patent application Ser. No. 85,713, filed on Oct. 30, 1970, now abandoned.

SUMMARY OF THE INVENTION

In accordance with this invention, it has been found that compounds selected from the formulae:

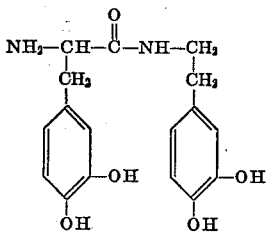
(I)

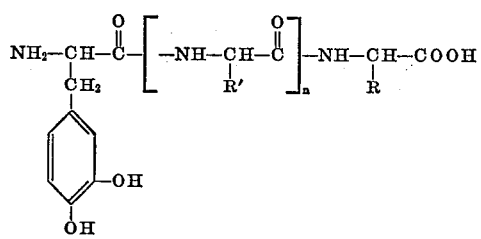
(II)

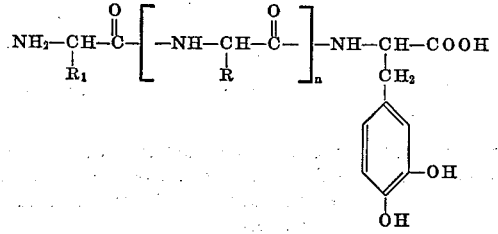
(III)

or

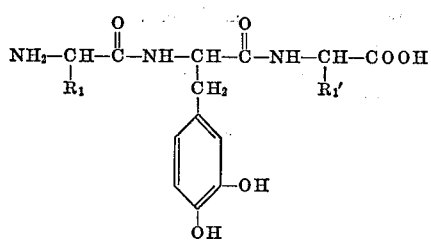
(IV)

wherein R and R' are

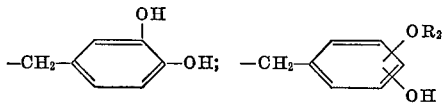

or the source of variation in structure which differentiates one natural protein occurring α-amino acid from another; $R_1$ and $R_1'$ are

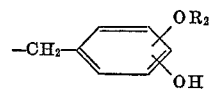

or the source of variation in structure which differentiates one natural protein occurring α-amino acid from another; $n$ is an integer of from 0 to 1; and $R_2$ is lower alkyl;

and salts thereof are useful as anti-Parkinson agents.

When $n$ in the compound of Formula II and Formula III is 0, the compounds of Formulae II and III are dipeptides having the formula:

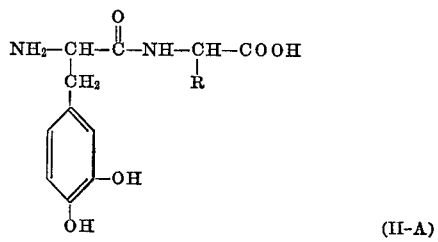
(II-A)

and

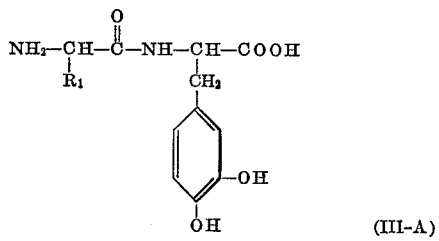
(III-A)

The products of Formulae I, II, III and IV above are prepared through the coupling of dopa which has the formula:

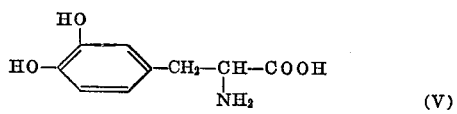
(V)

with any one of dopa, dopamine, an α-amino acid of the formula:

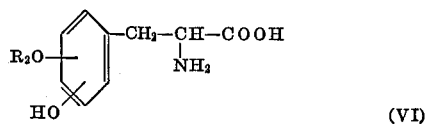
(VI)

wherein $R_2$ is as above;

or a natural α-amino acid occurring in proteins.

DETAILED DESCRIPTION

The term "halogen" includes all four halogens, i.e., chlorine, bromine, fluorine and iodine, with chlorine and fluorine being preferred.

The term "lower alkyl" comprehends both straight and branched chain saturated hydrocarbon moieties having from 1 to 6 carbon atoms, such as methyl, ethyl, propyl, i-propyl, t-butyl, and the like. The term "lower alkoxy" comprehends moieties which can be designated -O(lower alkyl), wherein lower alkyl is defined as above. Among the preferred lower alkoxy moieties are included methoxy, ethoxy and propoxy.

The term "aryl" as used throughout the application includes mono-nuclear aryl groups such as phenyl which can be substituted or unsubstituted in one or more positions with hydroxy, methylenedioxy, halogen, nitro, lower alkyl, lower alkoxy substituents and polynuclear aryl groups such as naphthyl, anthryl, phenanthryl, azulyl, etc., which may be substituted with one or more of the aforementioned groups.

The term "aryl-lower alkoxycarbonyl, comprehends aryl-lower alkoxycarbonyl groups wherein the aryl and lower alkoxy moieties are defined as above. The preferred aryl-lower alkoxycarbonyl groups are phenyl-lower alkoxycarbonyl with benzyloxycarbonyl being especially preferred.

The term "alkoxycarbonyl" as used herein includes lower alkoxycarbonyl groups wherein lower alkoxy is defined as above. Among the preferred lower alkoxycarbonyl groups are included methoxycarbonyl, ethoxycarbonyl and isopropoxycarbonyl, with methoxycarbonyl being especially preferred.

The term "lower alkanoyl" includes alkanoyl radicals containing from 2 to 6 carbon atoms such as acetyl, propionyl butyryl, etc. The term "aryl-lower alkanoyl" includes aryl lower alkanoyl radicals wherein "aryl" and lower alkanoyl are defined as above. The preferred aryl lower alkanoyl radical is benzoyl.

As used in this specification (D) and (L) define the absolute configuration about the asymmetric carbon of the stereoisomer of the formulat set forth.

The compounds of Formulae I, II, III and IV and their salts are useful as anti-Parkinson agents. The compounds of Formulae, I, II, III and IV as well as their salts, are used in the form of conventional pharmaceutical preparations which contain said compounds in connection with conventonal pharmaceutical organic or inorganic materials suitable for internal administration. The pharmaceutical compositions containing the compounds of Formulae I, II, III and IV as well as their salts can be administered parenterally or orally. Dosages can be adjusted to individual requirements, for example, these compounds can be administered in dosages of from about 10 mg./kg. to about 70 mg./kg. p.o. per day. These dosages can be administered in a single dosage form or in divided dosage forms. The pharmaceutical compositions can contain conventional organic or inorganic inert carrier materials such as water, gelatin, lactose, starch, magnesium stearate, talc, vegetable oils, gums, polyalkylene glycols, Vaseline and the like. The pharmaceutical preparations can be inconventional solid dosage forms such as tablets, dragées, suppositories, capsules or in conventional liquid dosage forms such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They can also contain other therapeutically useful materials. Compositions can be formulated which contain from 1% to 99% of the active ingredient of Formulae I, II, III and IV and from 1% to 99% by weight of inert carrier materials.

The compounds of Formulae II, III and IV above, in the form of their free acids, are amphoteric in character. These compounds dissolve in water as well as in acids or in alkalies in which they form salts.

In accordance with this invention, the compounds of Formulae I, II, III and IV with their pharmaceutically acceptable salts exhibit the aforementioned beneficial therapeutic properties. The compounds of Formulae II, III and IV form a pharmaceutically acceptable salt, with both inorganic and organic pharmaceutically acceptable acids as well as bases. The compound of Formula I forms salts with pharmaceutically acceptable acids. Among the acids which the compounds of Formulae I, II, III and IV form pharmaceutically acceptable acid addition salts are included hydrochloric acid, hydrobromic acid, sulfuric acid, phosphoric acid, citric acid, acetic acid, succinic acid, maleic acid, methanesulfonic acid, p-toluenesulfonic acid and the like. Such acid addition salts are also within the scope of the invention.

The compounds of Formulae II, III and IV also form pharmaceutically acceptable basic salts. Among the preferred pharmaceutically acceptable basic salts of the compounds of Formulae I, II, III and IV are included alkali metal salts, such as sodium or potassium or the alkaline earth metal salts such as calcium.

That the compounds of Formulae I, II, III and IV are effective anti-Parkinson agents can be seen by the fact that compounds such as L-3-(3,4-dihydroxyphenyl)-alanyl-L-3-(3,4-dihydroxyphenyl)-alanine, glycyl-L-dopa; and L-tyrosyl-L-dopa have $ED_{50}$'s less than 300 mg./kg. i.p. when administered to mice having catatonia induced by reserpine in accordance with the procedure described by Chesare et al. in Archives Internationals, Pharmacodynamie et de Therapic 169, 26 (1967). On the other hand, the $ED_{50}$ of L-dopa when administered by the same method was 430 mg./g. i.p.

Dopa of Formula V and the α-amino acids utilized as starting materials can be in their L-form, their D-form or in the form of a racemic mixture. Generally, it is preferred to utilize the L-form of these starting materials.

In the compounds of Formulae II, III and IV, R, R', $R_1$ and $R_1'$ can be the residue of any natural α-amino acid which occurs in proteins. Among the natural α-amino acids that occur in proteins which can be utilized as the starting materials in this inventon are the following:

| | |
|---|---|
| Glycine | Arginine |
| Alanine | Lysine |
| Valine | Hydroxylsine |
| Leucine | Phenylalanine |
| Isoleucine | Tyrosine |
| Cysteine | Asparagine |
| Cystine | Glutamine |
| Methionine | Proline |
| Serine | Hydroxyproline |
| Threonine | Histidine |
| Aspartic acid | Tryptophan |
| Glutamic acid | Pyroglutamic acid |

In accordance with this invention are included compounds of the formula:

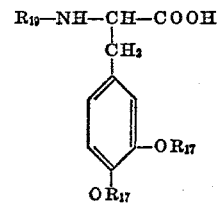

wherein $R_{19}$ is aralkoxycarbonyl; $R_{17}$ is hydrogen or aralkoxycarbonyl;

and pharmaceutically acceptable salts thereof.

The compounds of Formula XX above, are useful in a manner similar to the compounds of Formulae I, II, III and IV as anti-Parkinson agents.

In preparing compounds of Formula II where n is 0, i.e., a compound of Formula II–A, an L-dopa derivative of the formula:

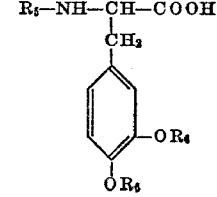

wherein $R_5$ is a conventional amino protecting group which can be removed by hydrogenolysis or hydrolysis; and $R_6$ is hydrogen or a group convertible thereto by hydrolysis or hydrogenolysis;

is coupled by means of a peptide coupling reaction with an α-amino acid derivative of the formula:

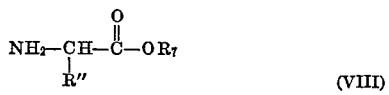

wherein R″ is

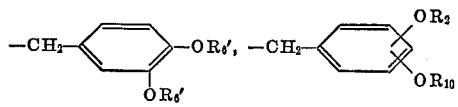

or the source of variation in structure between natural protein occurring α-amino acids wherein all free amino or carboxyl groups are protected with a group convertible thereto by hydrolysis or hydrogenolysis and any free hydroxy groups may be protected by a protecting group convertible thereto by hydrolysis or hydrogenolysis; and $R_7$ is a lower alkyl or aryl lower alkyl group; R is as above; $R_6'$ is a hydrogen or a group convertible thereto by hydrogenolysis or hydrolysis and $R_{10}$ is hydrogen or a group convertible thereto by hydrogenolysis;

to produce a compound of the formula:

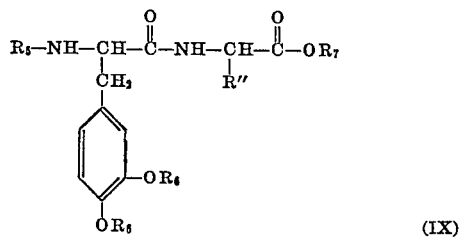

wherein R″, $R_5$, $R_6$ and $R_7$ are as above.

Any conventional means of peptide coupling can be utilized to react the compound of the Formula VII with a compound of the Formula VIII to produce a compound of the Formula IX. Among the conventional means for forming peptides which can be utilized in carrying out the process of this invention is to react the amine of Formula VIII with a compound of Formula VII with the carboxylic acid group of Formula VII converted to a reactive functional derivative thereof. Any conventional reactive derivative of an acid which will form a peptide bond with an amino group can be utilized in carrying out these reactions. Among the preferred reactive functional acid derivatives are halides, azides, anhydrides and active esters such as N-hydroxy-succinimide ester, or para nitrophenyl ester, or activation by a C—N or a C—C multiple bond such as N,N′-dialkylated carbodiimde. Any of the conditions conventional in reacting these acid functional derivatives with an amine to form a peptide linkage utilized in accordance with this invention.

A preferred method of carrying out this coupling is by reacting the compound of Formula VII with a compound of Formula VIII in the presence of a peptide coupling agent. Any conventional peptide coupling agent can be utilized in carrying out this reaction. Among the preferred peptide coupling agents are included dicyclohexylcarbodiimide, carbonyldiimidazole and alkylchloroformate such as ethyl-chloroformate, isobutylchloroformate and other lower alkyl chloroformates as well as aryl chloroformates such as phenyl chloroformate. Generally, this reaction is carried out in an inert organic solvent. Any conventional inert organic solvent can be utilized. Among the preferred inert organic solvents are included tetrahydrofuran, ethyl acetate, methylene chloride, chloroform, dioxane, and dimethylformamide. In carrying out this reaction, temperatures of from −30° C. to 60° C. are generally utilized with temperatures of from about −10° C. to about 25° C. being preferred. Generally, it is preferred to start the reaction at a temperature of from about −10° C. and slowly allow the temperature of the reaction to rise to about 25° C.

In the compound of Formula VII, $R_5$ can be any conventional amino protecting group which can be easily removed by hydrogenolysis and hydrolysis. Among the preferred amino protecting groups which can be utilized in accordance with this invention are aralkoxycarbonyl groups such as benzyloxycarbonyl as well as t-butyloxycarbonyl.

The compound of the Formula VII containing the amino protecting group is formed by reacting, in a conventional manner, the compound of the Formula V with an activated acid derivative of the protecting group such as a halide of the protecting group to produce a compound of the formula:

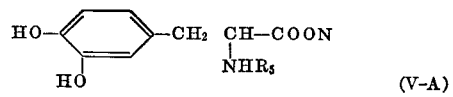

wherein $R_5$ is as above.

Among the activated acid derivatives are included aralkoxycarbonyl halides and t-butyloxycarbonyl azides. Any of the conventional methods of reacting an amine with an activated acid derivative to form a protected amine can be utilized in carrying out this reaction. Particularly preferred for use in this invention is benzyloxycarbonyl chloride.

In the compound of Formula VII where $R_6$ is a protective group removable by hydrogenolysis or hydrolysis, any conventional hydroxy protecting group can be utilized. Among the preferred protecting groups are included aralkoxycarbonyl groups such as benzyloxycarbonyl; lower alkanoyl, aralkanoyl such as benzoyl; alkyl groups and aryl lower alkyl groups. The protecting groups can be formed by reacting the compound of Formula V-A with an aralkoxycarbonyl halide, lower alkanoyl halide, aralkanoyl halide, lower alkyl halide or an aryl lower alkyl halide. Any conventional means of reacting a hydroxy group with a halide can be utilized in carrying out this reaction.

If it is desired to produce the compound of Formula VII whereis $R_5$ and $R_6$ are aralkoxycarbonyl groups, the reaction is carried out wherein at least 3 moles of the aralkoxycarbonyl halide is utilized per mole of the compound of Formula V.

In preparing the compound of Formula VIII, an α-amino acid of the formula:

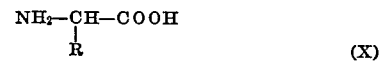

wherein R is as above;

is esterified with a lower alkanol or an aryl lower alkanol. This esterilcation will also esterify free carboxyl groups that may be present in the residue of the α-amino acid designated by R such as are present in aspartic and glutamic acid. Any conventional method of esterification can be utilized to carry out this reaction. Among the preferred methods for esterifying the compound of the Formula X is by treating the compound of Formula X with a lower alkanol or aryl lower alkanol in the presence of a dehydrating agent. Among the preferred alcohols for esterifying the α-amino acids are methyl alcohol, ethyl alcohol, benzyl alcohol, isopropyl alcohol, etc. Among the preferred dehydrating agents are included thionyl chloride and sulfuric acid. If desired, a solvent may be utilized in carrying out this esterification reaction. Any conventional inert organic solvent can be utilized for this purpose. Generally, it is preferred to carry out this reaction utilizing excess alcohol as a solvent medium. On the other hand, conventional organic solvents such as diethyl ether, tetrahydrofuran, etc., can be utilized. In carrying out this reaction, temperature and pressure are not critical and this reaction can be carried out at room temperature and atmospheric pressure. If desired, however, temperatures as high as reflux temperatures and as low as −10° C. can be utilized.

In the case where R in the compound of Formula X does not contain any amino groups, the compound produced by the esterification of the α-amino acid of Formula X can be utilized to react with the compound of Formula VII to produce a compound of the Formula IX.

On the other hand, where R in the compound of Formula X contains a free amino group and/or where it is desired to protect the free hydroxy groups or other functional groups which are present in the substituent R, then a compound of Formula X is converted to a compound of Formula VIII by the following reaction scheme:

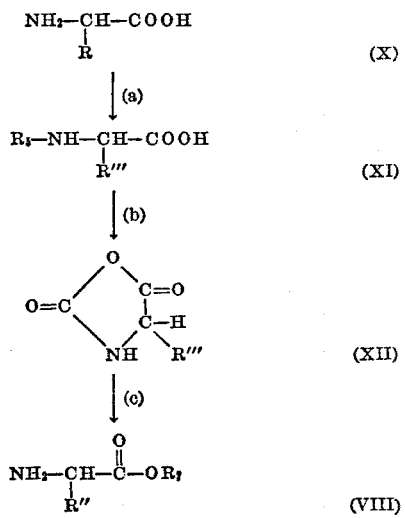

wherein R″, R₇ and R₅ are as above; and R‴ is

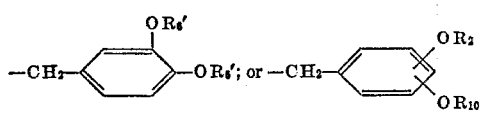

or the source of variation in structure between natural protein occurring α-amino acid wherein all free amino groups are protected by a group convertible thereto by hydrolysis or hydrogenolysis and the free hydroxy groups may be protected by protecting groups convertible thereto by hydrolysis or hydrogenolysis; and $R_2$, $R_{10}$, and $R_6'$ are as above.

The compound of Formula XI can be prepared from a compound of Formula X by protecting the free amino and/or hydroxy or other functional groups in the compound of Formula X as described in connection with the formation of the compound of Formula VII.

The compound of Formula XI is converted to the compound of Formula XII by treating the compound of Formula XI with an agent selected from the group consisting of thionyl chloride, phosphorus oxychloride or phosphorus pentachloride. This reaction is generally carried out in an inert organic solvent at reflux temperature. Any conventional inert organic solvent can be utilized. Generally, it is preferred to utilize solvents such as ethyl acetate or benzene.

The compound of Formula XII is converted to the compound of Formula VIII by treating the compound of Formula XII with an esterifying agent such as a lower alkanol or an aryl lower alkanol. Any of the conditions conventional in esterifying anhydrides can be utilized to convert the compound of Formula XII to the compound of Formula VIII. This process of esterification provides a means for protecting all free carboxy groups as well as all of the other free functional groups which may be present on the amino acid residue.

The compound of Formula III above where $n$ is 0, i.e. the compound of Formula III-A above, is prepared by first reacting a compound of the formula:

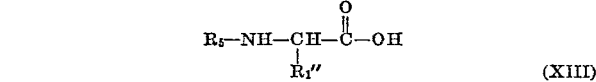

wherein $R_5$ is as above; and $R_1''$ is

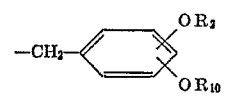

or the source of variation in structure between different natural protein occurring α-amino acid wherein all free amino and carboxyl groups are protected by a group convertible thereto by hydrolysis or hydrogenolysis and wherein the free hydroxy group may be protected by a group convertible to free hydroxy by hydrolysis or hydrogenolysis; and $R_2$ and $R_{10}$ are as above;

with a compound of the formula:

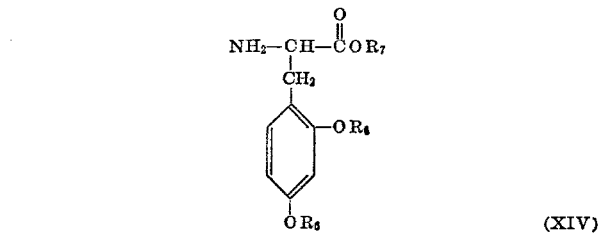

wherein $R_6$ and $R_7$ are as above;

to produce a compound of the formula:

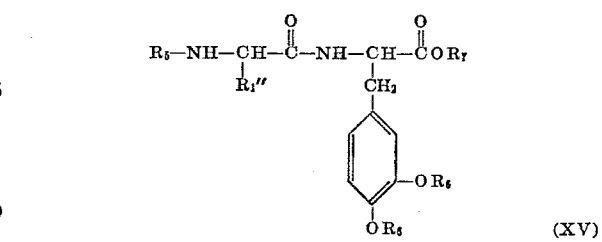

wherein $R_1''$, $R_5$, $R_6$ and $R_7$ are as above.

The compound of the Formula XIV can be coupled with the compound of the Formula XIII in the same manner as disclosed in connection with the coupling of the compound of the Formula VII and compound of the Formula VIII.

The compound of Formula XIV can be produced from dopa by the same means as described in connection with converting the α-amino acid of Formula X to the protected amino acid ester of Formula VIII.

In preparing the compound of Formula XIII, the free amino and hydroxy groups of the α-amino acid are protected by conventional protecting groups which are convertible to free hydroxy or amino groups by hydrolysis or hydrogenolysis in the same manner described in connection with the formation of the compound of Formula VII. Any free carboxyl group in $R_1$ can be esterified by treating the α-amino acid with an alcohol and mineral acid such as hydrochloric acid. In this manner esterification will take place selectively on the carboxyl groups remote from the carbon atom. Any conventional method of forming an ester can be utilized in protecting the free carboxy moieties on the amino acid residue.

In forming the compound of the Formula I, a compound of the formula:

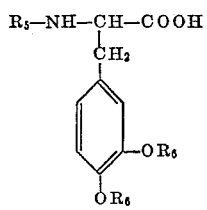
(VII)

wherein $R_5$ and $R_6$ are as above;

is reacted with dopamine or a dopamine derivative of the formula:

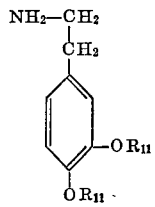
(XVI)

wherein $R_{11}$ is hydrogen or a group convertible thereto by hydrolysis;

to produce a compound of the formula:

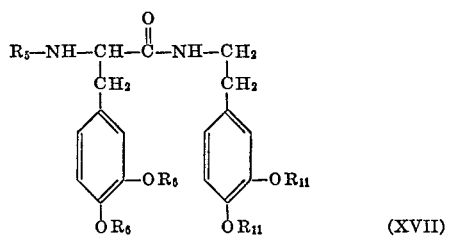
(XVII)

wherein $R_5$, $R_6$ and $R_{11}$ are as above.

This coupling reaction is carried out by the same manner as described in connection with the coupling of a compound of the Formula VII with a compound of the Formula VIII to produce a compound of the Formula IX.

The compounds of Formulae IX, XV, XVII can be converted to a compound of the Formulae I, II–A and III–A by hydrogenolysis and/or hydrolysis depending upon the protecting groups as defined by $R_5$, $R_6$, $R_6'$, $R_7$, $R_{10}$ and $R_{11}$.

In the compound of Formulae IX, XV, and XVII, where $R_5$ is aralkoxycarbonyl, $R_7$ is aryl lower alkyl, and $R_6$ and $R_6'$ are aryl lower alkyl or aryl lower alkoxycarbonyl, these groups can be removed by either hydrolysis or hydrogenolysis. The hydrogenolysis can be carried out by catalytic hydrogenation. Any conventional means of catalytic hydrogenation can be utilized in carrying out this hydrogenation step. Among the preferred methods of hydrogenation are included hydrogenating in the presence of a palladium catalyst, preferably palladium on barium sulfate in a solvent medium consisting of an alcohol and an organic acid such as a mixture of acetic acid and methanol. However, in accordance with this invention, any conventional hydrogenation catalyst such as palladium oxide, palladium chloride, etc., can be utilized. In carrying out this reaction, any conventional solvent can be utilized such as the solvent hereinbefore set forth. Among the preferred solvents for use in this reaction are included tetrahydrofuran, ethyl acetate, dioxane, diethyl ether, etc. Generally, this reaction is carried out at temperatures of from about 0° C. to 100° C., depending upon the reflux and freezing temperature of the solvent.

In the case where all of the protecting groups on the compounds of Formulae IX, XV and XVII are not removed by hydrogenolysis, hydrogenolysis of the compounds of Formulae IX, XV and XVII produce compounds having the formula:

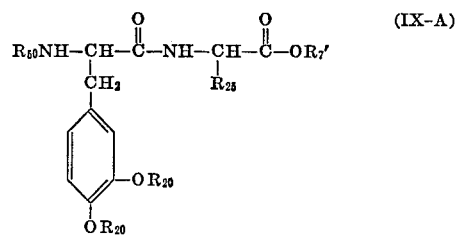
(IX-A)

wherein $R_{50}$ is hydrogen or a group convertible thereto by hydrolysis; $R_2$ is lower alkyl; $R_7'$ is hydrogen or lower alkyl; $R_{20}$ and $R_{26}$ are hydrogen or a group convertible thereto by hydrolysis; $R_{25}$ is

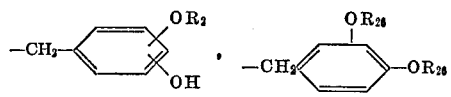

or the source of variation in structure between different natural protein occurring α-amino acids wherein all hydroxy, carboxy and amino groups are free or protected by a group convertible thereto by hydrolysis, with the proviso that one of $R_{20}$, $R_{26}$, $R_{50}$, and $R_7'$ is other than hydrogen;

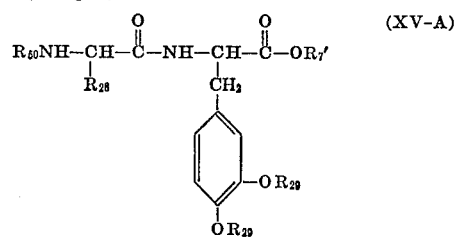
(XV-A)

wherein $R_{50}$ is as above; $R_7'$ is hydrogen or lower alkyl; $R_{29}$ is hydrogen or a group convertible thereto by hydrolysis; $R_{28}$ is

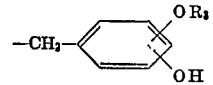

or the source of variation in structure between different natural protein occurring α-amino acids wherein all amino, carboxy and hydroxy groups are free or protected by a group removable by hydrolysis; $R_3$ is lower alkyl with the proviso that one of $R_{50}$, $R_{29}$ and $R_7$, is other than hydrogen;

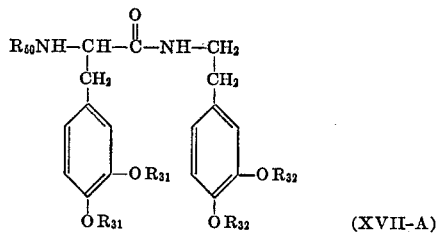
(XVII-A)

wherein $R_{50}$ is as above; $R_{31}$ and $R_{32}$ are hydrogen or a group convertible thereto by hydrolysis with one of $R_{50}$, $R_{31}$ and $R_{32}$ being other than hydrogen.

The compounds of Formulae IX-A, XV-A and XVII-A falling outside the scope of Formulae IX, XV and XVII are those which contain one free amino and/or carboxy group.

The compounds of Formulae IX, XV and XVII can be hydrolyzed by acid treatment. If desired, this acid treatment can be carried out before or after the hydrogenation procedure set forth above. In carrying out this acid hydrolysis, any strong mineral acid can be utilized. Among the preferred strong mineral acids are included sulfuric acid, hydrochloric acid, hydrobromic acid and hydroiodic acid, the preferred acids being hydrobromic acid and hydroiodic acid. When a strong mineral acid is utilized, the reaction is generally carried out in an organic solvent such as acetic acid, dioxane or acetone at temperatures of 25 to 100° C. A means of hydrolyzing these groups in the compounds of Formulae IX, XV and XVII is by treatment with a Lewis acid such as borontrifluoride etc. This acid treatment is carried out in an ether or halogenated hydrocarbon solvent, preferably methylene chloride and/or an ethyl ether. In carrying out this reaction, temperatures of from −78° C. to 35° C. are utilized. This acid treatment of the compound of Formula IX, XV and XVII will also hydrolyze and remove aryl lower alkyl or alkyl groups which may be utilized to protect the hydroxy groups, aryl lower alkyl or alkyl groups which may be utilized to protect the carboxy groups and t-butoxy carbonyl which may be utilized to protect the amino groups.

When R″ and $R_1″$ in the compounds of Formula IX, and Formula XV are formed from natural α-amino acids containing an additional free amino or carboxy radical which radicals are protected by a protecting group that can be hydrolyzed or hydrogenated to form the free amino or carboxy radical, these protecting groups can be removed by hydrogenation or hydrolysis, depending upon the group, in the manner given before. In the case where the free carboxyl group is esterified with an alkyl radical these esters can be hydrolyzed in the aforementioned manner. In the case where the acid residue contains an additional free amino group such as lysine, and the amino group is protected by an aralkoxycarbonyl radical such as carbobenzoxy, this radical can be removed by hydrogenation or hydrolysis in the aforementioned manner. Furthermore, where the amino acid residues which contain a free hydroxy group such as tyrosine which is protected by an alkyl, alkanoyl or aralkanoyl radical, these protected radicals can be removed to regenerate the free hydroxy group by hydrolysis. On the other hand, where the free hydroxy groups are protected by an aralkoxy-carbonyl or aralkyl, these protective groups can be removed to regenerate the free hydroxy group by hydrogenation or hydrolysis in the manner given above.

In accordance with this invention, it has been found that when $R_6$ and $R_{11}$ in the compounds of Formulae VII, XIV and XVI are aralkoxycarbonyl, lower alkyl, t-butoxycarbonyl, aryl lower alkyl, lower alkanoyl or aryl lower alkanoyl, coupling provides an efficient means for producing compounds of Formulae IX, XV and XVII. By providing these substituents on the hydroxy groups of the phenyl moiety of the compounds of Formulae VII, XIV, and XVI, the compounds of Formulae IX, XV, and XVII may be obtained with a high degree of purity.

The compound of Formula II above wherein $n$ is 1 has the formula:

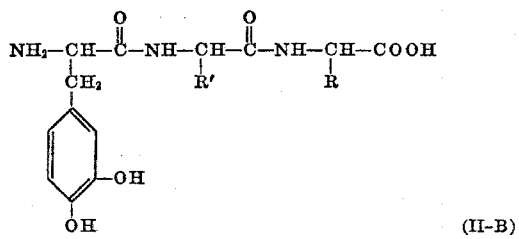

(II-B)

wherein R′ and R are as above.

The compound of Formula II–B is prepared by first condensing compounds of the formula:

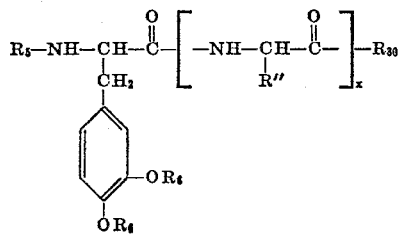

(XXV)

and

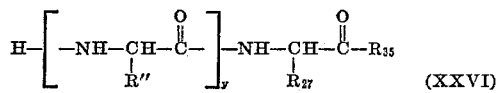

(XXVI)

wherein $R_{27}$ is

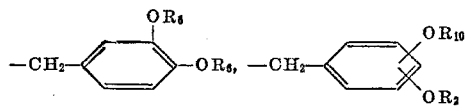

or the source of variation in structure between natural protein occurring α-amino acids wherein all free amino or carboxy groups are protected by a group convertible thereto by hyrogenolysis or hydrolysis, and any free hydroxy group may be protected by a group convertible thereto by hydrolysis or hydrogenolysis; $x$ and $y$ are integers of from 0 to 1 with the sum of $x$ and $y$ being equal to 1; R″, $R_2$, $R_5$, $R_6$ and $R_{10}$ are as above; $R_{30}$ is —OH or a reactive functional acid derivative, and $R_{35}$ is —OH, aryl lower alkoxy or lower alkoxy with the proviso that one of $R_{30}$ and $R_{35}$ is other than —OH;

to produce a compound of the formula:

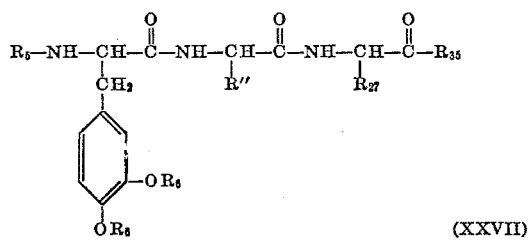

(XXVII)

wherein $R_5$, $R_6$, $R_{27}$ and $R_{35}$ are as above;

and then subjecting a compound of the Formula XXVII to either hydrolysis or hydrogenolysis or both hydrogenolysis or hydrolysis.

Where $R_{30}$ in the compound of the Formula XXV is a reactive organic carboxylic acid functional derivative, any conventional reactive derivative of an organic acid which will form a peptide bond with the amino group can be utilized. Among the reactive functional acid derivatives are the reactive functional derivatives set forth in connection with the condensation reaction of a compound of the Formula VII with a compound of the Formula VIII. The preferred reactive functional derivatives are the active esters such as para-nitro phenyl ester. Where $R_{30}$ is a reactive functional acid derivative and $R_{35}$ is hydroxy, alkoxy or aryl lower alkoxy, the condensation reaction to form the compound of Formula XXVII can be carried out utilizing any of the conventional methods for reacting an organic reactive functional derivative of an organic acid with an amine to form an amide linkage. This reaction may be carried out in the presence of a tertiary amine base. However, this reaction can be carried out simply in an inert organic solvent without the presence of a base. The presence of a tertiary amine base improves the rate of this coupling reaction. Any conventional tertiary amine base can be utilized. Among the preferred tertiary amines are included triethyl amine, pyridine, trimethyl amine, N-ethyl-N,N-dimethyl amine, N-methyl piperidine, etc. In carrying out this reaction, any conventional inert organic solvent can be utilized as the reaction medium. Among the preferred solvents are included ethyl acetate, tetrahydrofuran and dimethyl formamide. Furthermore, in carrying out this reaction temperatures of from −10° C. to 50° C. are generally utilized, with temperatures of from 10° C. to 30° C. being preferred.

Where $R_{30}$ is a hydroxy group and $R_{35}$ is lower alkoxy or aryl lower alkoxy group, this reaction can be carried out in the presence of a peptide coupling agent utilizing the conditions described in connection with the reaction of the compound of the Formula VII with a compound of the Formula VIII.

The compound of the Formula XXVII can be converted to the compound of the Formula II by hydrogenolysis or hydrolysis or both hydrolysis and hydrogenolysis depending upon the protecting groups as defined by $R_5$, $R_6$, $R_{27}$, $R''$ and $R_{35}$. This reaction can be carried out in the same manner as described in connection with the conversion of the compound of the Formulae IX, XV and XVII to their respective dipeptides.

In the case where all the protective groups of the compound of Formula XXVII are not removed by hydrogenolysis, hydrogenolysis of the compound of the Formula XXVII produces a compound having the formula:

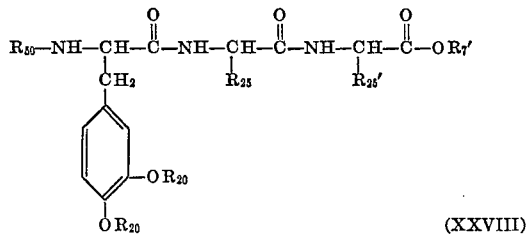
(XXVIII)

wherein $R_{25}'$ is

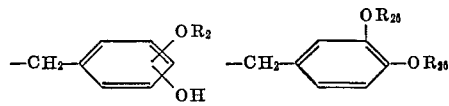

or the source of variation in structure between different natural protein occurring α-amino acids wherein all hydroxy, carboxy and amino groups are free or protected by a group convertible thereto by hydrolysis; $R_2$, $R_7'$, $R_{20}$, $R_{25}$, $R_{26}$ and $R_{50}$ are as above; with the proviso that the compound contains at least one of the hydroxy, carboxy or amino groups protected by a group removable by hydrolysis.

The compound of Formula XXVIII can be converted to the compound of Formula II–B by hydrolysis as described hereinbefore.

The compound of Formula III wherein $n$ is 1 has the formula:

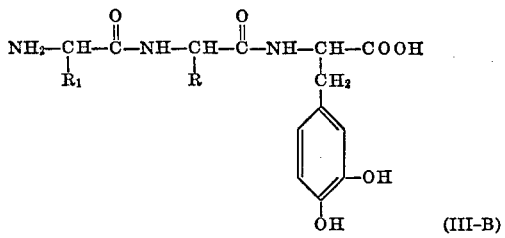
(III–B)

wherein $R_1$ and $R$ are as above.

The compound Formula III–B is prepared by condensing compounds of the formula:

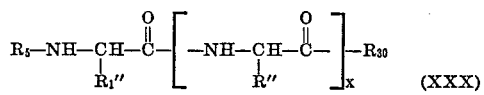
(XXX)

and

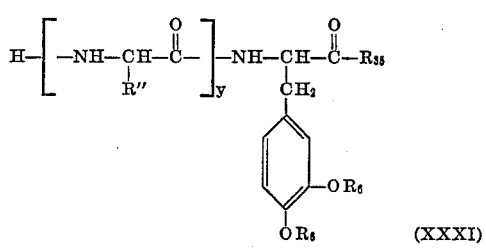
(XXXI)

wherein $R_1''$, $R''$, $R_5$, $R_6$, $R_{30}$, $R_{35}$ and $x$ and $y$ are as above;

to produce a compound of the formula:

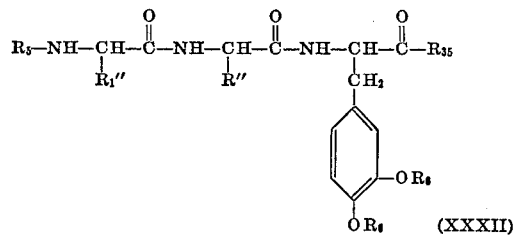
(XXXII)

wherein $R''$, $R_1''$, $R_5$, $R_6$ and $R_{35}$ are as above;

and then subjecting a compound of the Formula XXII to hydrolysis, hydrogenolysis or both hydrolysis and hydrogenolysis to produce the compound of Formula III–B.

The condensation of the compound of the Formula XXX with the compound of Formula XXXI to produce a compound of the Formula XXXII is carried out as described in connection with the formation of a compound of the Formula XXVII. Hydrogenolysis and/or hydrolysis of the compound of Formula XXXII to produce a compound of the Formula III–B is carried out in the manner described in connection with the conversion of compounds of the Formula XXVII to a compound of the Formula II–B.

When hydrogenolysis of the compound of Formula XXXII does not remove all of the protecting groups, the compound produced thereby has the formula:

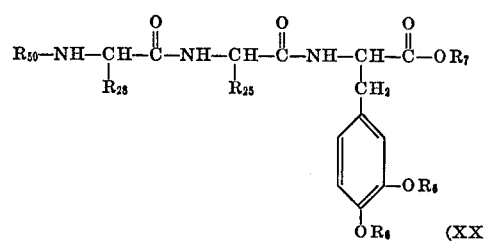
(XXXIII)

wherein $R_6$, $R_7$, $R_{25}$, $R_{28}$ and $R_{50}$ are as above, with the proviso that the compound contains at least one of the hydroxy, carboxy or amino groups protected by a group removable by hydrolysis.

The compound of Formula XXXIII can be converted to the compound of Formula III–B by hydrolysis as described hereinbefore.

The compound of Formula IV is prepared by first condensing compounds of the formula:

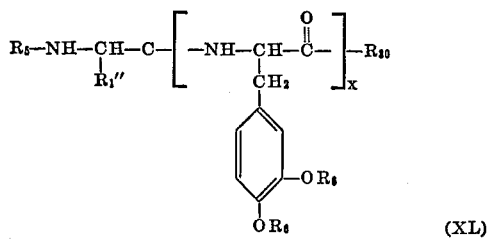
(XL)

and

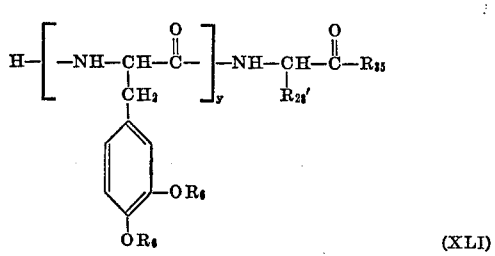
(XLI)

wherein $R_1$, $R_1'$, $R_5$, $R_6$, $R_{30}$, $R_{35}$, $x$ and $y$ are as above;

by the procedure given in connection with the condensation of compounds of the Formula XXV with compounds of the Formula XXVI, to produce a compound of the formula:

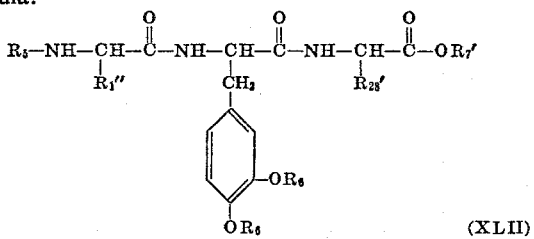

(XLII)

wherein $R_5$, $R_6$, $R_7'$, $R_1''$ are as above; and $R_{28}'$ is

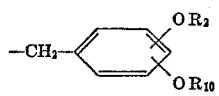

or the source of variation in structure between different natural protein occurring α-amino acids wherein all amino and carboxy groups are protected by a group removable by hydrolysis or hydrogenolysis and wherein all free hydroxy groups may be protected by a group convertible to free hydroxy by hydrolysis and $R_2$ and $R_{10}$ are as above.

The compound of Formula XLII can be converted to the compound of Formula IV by hydrogenolysis or hydrolysis or by both hydrogenolysis or hydrolysis in the manner described hereinbefore.

If, upon hydrogenolysis all of the protecting groups are not removed from the compound of Formula XLII, the resulting compound has the formula:

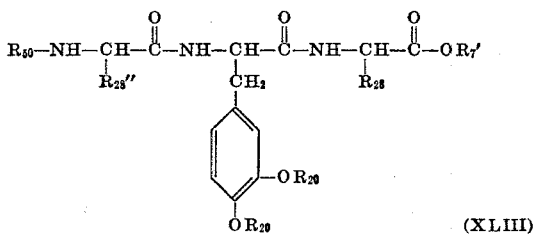

(XLIII)

wherein $R_7'$, $R_{20}$, $R_{28}$ and $R_{50}$ are as above; $R_{28}''$ is

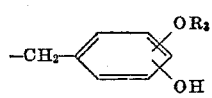

or the source of variation in structure between different natural protein occurring α-amino acids where all amino, carboxy, and hydroxy are free or protected by a group removable by hydrolysis, and $R_3$ is as above with the proviso that the compound contains at least one of the hydroxy, carboxy or amino groups protected by a group removable by hydrolysis.

The compound of Formula XLIII can be converted to the compound of Formula IV by hydrolysis in the manner described hereinbefore.

The invention is fully illustrated in the following examples. All temperatures are in degrees centigrade. The ether utilized in these examples is diethyl ether. The petroleum ether utilized had a boiling range of from 37 to 63° C.

EXAMPLE 1

L-3-(3,4-dihydroxyphenyl)alanine benzyl ester hydrochloride

A mixture of L-dopa (10.0 g., 0.05 mole) and benzyl alcohol (250 ml.) was placed in a 1 l. round-bottomed flask fitted with a reflux condenser, magnetic stirring assembly and immersed in an ice bath. Thionyl chloride (50 ml.) was added dropwise with stirring over a 30 minute period. The ice bath was removed and the solution was heated to 100° for 6 hours. At the end of this time the solution was treated with diethyl ether and allowed to stand at 0° C. There was obtained L-3-(3,4-dihydroxyphenyl)alanine benzyl ester hydrochloride as a crystalline product. Crystallization from ethanol diethyl ether gave product, M.P. 174–178° C.

This hydrochloride was converted to L-3-(3,4-dihydroxyphenyl)alanine benzyl ester by treatment with saturated aqueous sodium bicarbonate extraction into ethyl acetate and evaporation to dryness.

EXAMPLE 2

N-benzyloxycarbonyl-L-3-(3,4-dihydroxyphenyl)alanine

Into a 1 l. 3-necked round bottomed flask equipped with 2 dropping flasks, mechanical stirrer and immersed in an ice-salt bath was placed 55 ml. of 1.0 M NaOH (0.055 mole) and water (300 ml.) added. Nitrogen was bubbled through the system and L-dopa (11.95 g., 0.06 mole) was added. Carbobenzoxychloride (9.35 g., 0.055 mole) in diethyl ether (55 ml.) and 55 ml. of 1.0 M NaOH (0.055 mole) were simultaneously added dropwise to the rapidly stirring mixture over a 30 minute period.

The reaction mixture stirred for 4 hours at −5° C. It was transferred to a separatory funnel and rapidly extracted 3 times with diethyl ether. The aqueous layer was acidified with aqueous 2 M HCl to pH 2 and extracted 3 times with diethyl ether. This ether layer was dried over magnesium sulfate, filtered and evaporated to dryness. There was obtained N-benzyloxycarbonyl-L-3-(3,4-dihydroxyphenyl)alanine as a white amorphous solid.

EXAMPLE 3

N-benzyloxycarbonyl-L-3-(3,4-dihydroxyphenyl)alanyl-L-3-(3,4-dihydroxyphenyl)alanine benzyl ether Into a 250 ml. round-bottomed flask equipped with a magnetic stirring assembly and immersed in an ice-salt bath was placed N-benzyloxycarbonyl-L-3-(3,4-dihydroxyphenyl)alanine (1.7 g., 5 mmole) in tetrahydrofuran (75 ml.). L-3-(3,4-dihydroxyphenyl)alanine benzyl ester (1.5 g., 5 mmole) was added. The clear solution was treated with dicyclohexylcarbodiimide (1.05 g., 5 mmole) and the reaction mixture stirred 2 hours at −5°. It was warmed to room temperature (precipitation of urea commenced) and stirred at room temperature overnight. It was filtered, evaporated to dryness, taken up in ethyl acetate and extracted three times each in turn with saturated aqueous sodium bicarbonate saturated brine and hydrochloric acid, dried over magnesium sulfate, filtered and evaporated to dryness. There was obtained N-benzyloxycarbonyl - L - 3 - (3,4-dihydroxyphenyl)alanyl-L-3-(3,4-dihydroxyphenyl)alanine benzyl ester as an off-white amorphous solid.

EXAMPLE 4

L-3-(3,4-dihydroxyphenyl)alanyl-L-3-(3,4-dihydroxyphenyl)alanine

N-benzyloxycarbonyl - L - 3 - (3,4-dihydroxyphenyl)alanyl-L-3-(3,4 - dihydroxyphenyl)alanine benzyl ester (3.0 g., 5 mmole) was placed in a 500 ml. pressure bottle. Methanol (75 ml.), glacial acetic acid (5 ml.) and 5 g. of a mixture containing 5% by weight palladium and 95% by weight barium sulfate, were added and the reaction mixture was hydrogenated at 48 p.s.i. on the Parr hydrogenator for 4 hours. It was filtered, evaporated to dryness. The residue was taken up in water and evaporated to dryness. This procedure of evaporation from water was repeated 2 more times. The residue was taken up in water, filtered to remove some insoluble material and lyophilized. The resultant product was taken up in water (20 ml.), filtered and lyophilized. This procedure was repeated once more. There was obtained L-3-(3,4 - dihydroxyphenyl)alanyl-L-3-(3,4 - dihydroxyphenyl)alanine as a white amorphous solid, M.P. 168–171° C., which resolidifies and melts at 283–286° C. (dec.).

EXAMPLE 5

N,O,O'-tris-benzyloxycarbonyl - L - 3 - (3,4 - dihydroxyphenyl)alanine

Into a 3 liter 3-necked round-bottomed flask fitted with mechanical stirred, nitrogen inlet tube and immersed in an ice-salt bath was placed 240 ml. of 1 M aqueous NoOH (0.24 mole) and 500 ml. of water. Nitrogen was passed through the system for 15 minutes and L-dopa (47.4 g. 0.24 mole) added. To this cold stirring solution was added dropwise simultaneously 800 ml. of 1.0 M aqueous NaOH (0.80 mole) and benzyloxycarbonyl chloride (136.5 g., 0.80 mole) in 800 ml. diethyl ether. The addition required 30 minutes. The reaction mixture stirred at 0° C. for 2 hours and at 25° C. overnight. The reaction mixture was filtered and the precipitate was washed with diethyl ether, titurated with 1 N aqueous citric acid and extracted into diethyl ether (3× 250 ml.). This combined ethereal solution was dried over MgSO$_4$, filtered and evaporated to dryness. The residue was triturated with petroleum ether and dried in vacuo. There was obtained N,O,O'-tris-benzyloxycarbonyl-L-3-(3,4-dihydroxyphenyl)alanine as an amorphous tan solid (hygroscopic).

EXAMPLE 6

N,O,O'-tris-benzyloxycarbonyl - L - 3 - (3,4 - dihydroxyphenyl)alanyl-L-3-(3,4-dihydroxyphenyl)alanine benzyl ester Into each of two 1-liter 3-necked round-bottomed flasks equipped with a mechanical stirrer and immersed in an ice-salt bath was placed N,O,O'-tris-benzyloxycarbonyl-L-3-(3,4 - dihydroxyphenyl)alanine (16.0 g. each; 32.0 g., 0.0534 mole total) and L-3-(3,4-dihydroxyphenyl)alanine benzyl ester (7.67 g. each; 15.34 g., 0.0534 mole total) in 450 ml. of dry tetrahydrofuran. The reaction mixtures were cooled and dicyclohexylcarbodiimide (5.5 g. each; 11.0 g., 0.0534 mole total) in 30 ml. of tetrahydrofuran, dried by passage through a column of alumina, was added to each solution. The reaction mixtures stirred at 0° for 2 hours and at 25° overnight. The reaction mixtures were filtered and the filtrates combined and evaporated to dryness. The residual oil was taken up in 1.2 liter of diethyl ether, filtered and the filtrate extracted with saturated NaHCO$_3$ (3× 250 ml.), citric acid (3× 150 ml.) and saturated brine (3× 150 ml.). The ethereal layer was dried over MgSO$_4$, filtered and evaporated to dryness. The residual oil was taken up in a minimum amount of chloroform, filtered through a pad of silica gel, eluted with chloroform, hexane (1:1 parts by volume). The eluate was evaporated to dryness to yield N,O,O'-tris-benzyloxycarbonyl-L-3-(3,4 - dihydroxyphenyl)alanyl-L-3-(3,4-dihydroxyphenyl)alanine benzyl ester as an amorphous white solid.

EXAMPLE 7

L-3-(3,4-dihydroxyphenyl)alanyl-L-3-(3,4-dihydroxyphenyl)alanine

Into a 500 ml. pressure bottle was placed N,O,O'-tris-benzyloxycarbonyl - L - 3 - (3,4-dihydroxyphenyl)alanyl-L-3-(3,4-dihydroxyphenyl)alanine benzyl ester (30.3 g., 34.9 mmole). Methanol (200 ml.), acetic acid (glacial, 5.0 ml.) and 5 g. of a mixture containing 5% by weight palladium and 95% by weight barium sulfate were added and the mixture hydrogenated at 45.5 ps.i. for 17 hours. It was filtered through celite and evaporated to dryness. The residue was taken up in water (450 ml.) and extracted with ethyl acetate (3 × 300 ml.) and diethyl ether (200 ml.). The aqueous solution was evaporated to dryness, taken up in water and re-evaporated to dryness and finally lyophilized from water. There was obtained L-3-(3,4 - dihydroxyphenyl)alanyl - L - 3 - (3,4 - dihydroxyphenyl)alanine as a white amorphous solid, M.P. 151–154°.

EXAMPLE 8

N-α-benzyloxycarbonyl-L-3-(3,4-dibenzyloxycarbonyloxyphenyl)-N-(3,4-dimethoxyphenethyl) alaninamide Into a 250 ml. 1-necked round-bottomed flask immersed in an ice-salt bath was placed N,O,O'-tris-benzyloxycarbonyl-L-3-(3,4-dihydroxyphenyl)alanine (12.0 g., 0.02 mole) in dry tetrahydrofuran (50 cc.). Homoveratrylamine (3.62 g., 9.92 mole) was added and the solution stirred at −5° C. for 15 minutes.

Dicyclohexylcarbodiimide (4.13 g., 9.92 mole) was added and stirring continued at −5° C. for 2 hours and 25° C. for 2 days. The reaction mixture was filtered, evaporated to dryness, taken up in chloroform (75 cc.) and extracted with saturated aqueous NaHCO$_3$ (3× 50 cc.), saturated KCl (3× 50 cc.) and 2 M aqueous citric acid (3× 50 cc.). The chloroform layer was dried over MgSO$_4$, filtered and evaporated to dryness. The product was crystallized from methanol. There was obtained N-α-benzyloxycarbonyl - L - 3 - (3,4 - dibenzyloxycarbonyloxyphenyl)-N-(3,4-dimethoxyphenethyl)alaninamide as a white amorphous solid, M.P. 135.5–138.5° C.

EXAMPLE 9

L-3-(3,4-dihydroxyphenyl)-N-(3,4-dimethoxyphenethyl) alaninamide acetate

Into a 500 ml. pressure bottle was placed N-α-benzyloxycarbonyl-L-3-(3,4 - dibenzyloxycarbonyloxyphenyl)-N-(3,4-dimethoxyphenethyl) alaninamide (16.1 g., 0.0211 mole) in a mixture of methanol:tetrahydrofuran: acetic acid (100:50:10 parts by volume) and a mixture containing 5% by weight palladium and 95% by weight barium sulfate (5.0 g.). The reaction mixture was hydrogenated at 45 p.s.i. for 17 hours, filtered through Celite and evaporated to dryness. The residue was evaporated from water 4 times, taken up in water, filtered through charcoal and lyophilized. There was obtained L-3-(3,4-dihydroxyphenyl) - N - (3,4 - dimethoxyphenyl) alaninamide acetate as an amorphous white solid, M.P. decomposition from 74° C.

EXAMPLE 10

L-3-(3,4-dihydroxyphenyl)-N-(3,4-dihydroxyphenethyl) alaninamide hydrobromide

Into a 500 ml. 1-necked round-bottomed flask equipped with a magnetic stirring assembly and drying tube was placed L - 3 - (3,4-dihydroxyphenyl)-N-(3,4-dimethoxyphenethyl) alaninamide acetate (4.2 g., 0.01 mole) in methylene chloride (100 cc.). A solution of boron tribromide (12.5 g., 0.05 mole, 5 equivalents) in methylene chloride was added portionwise and the reaction mixture stirred at 25° C. overnight. Methanol (75 cc.) added and the solution evaporated to dryness. This evaporation from methanol was repeated two more times and was followed by evaporation from water (50 cc.). The residue was taken up in water (50 cc.), extracted with diethyl ether (3 × 25 cc.) and the aqueous layer evaporated to dryness. The residue was taken up in water, filtered through charcoal and lyophilized. There was obtained L-3-(3,4-dihydroxyphenyl)-N-(3,4 - dihydroxyphenethyl) alaninamide hydrobromide as an amorphous off-white solid, M.P. decomposition from 104° C.

EXAMPLE 11

Tablets are manufactured utilizing the following composition:

|  | Mg. |
|---|---|
| L - 3 - (3,4 - dihydroxyphenyl)alanyl-L-3-(3,4-dihydroxyphenyl)alanine | 100 |
| Lactose | 61 |
| Corn starch | 30 |
| Polyvinylpyrrolidone | 4 |
| Talcum | 5 |

The active substance is mixed with the lactose and the corn starch, and, after the addition of a solution of polyvinylpyrrolidone in 40 ml. of ethanol, granulated. The granulate is dried at 30° C., mixed with talcum and pressed to tablets.

| | Mg. |
|---|---|
| Individual weight of one tablet | 200 |
| Active substance content of one tablet | 100 |

EXAMPLE 12

Gelatin capsules are manufactured utilizing the following composition:

| | Mg. |
|---|---|
| L - 3 - (3,4 - dihydroxyphenyl)alanyl-L-3-(3,4-dihydroxyphenyl)alanine | 50.0 |
| Mannitol | 98.5 |
| Stearic acid | 1.5 |

The ingredients are homogeneously mixed and filled into interlocking gelatin capsules via a capsule filling machine.

| | Mg. |
|---|---|
| Individual weight of one capsule | 150 |
| Active substance content of one capsule | 50 |

EXAMPLE 13

L-3-(3,4-dihydroxyphenyl)alanine ethyl ester

A mixture of L-dopa (5 g., 0.025 mole) and ethanol (150 ml.) was placed in a 500 ml. round-bottomed flask fitted with a reflux condenser, magnetic stirring assembly and immersed in an ice bath. Thionyl chloride (25 ml.) was added dropwise with stirring over a 30 minute period. The ice bath was removed and the solution was heated to reflux for 4 hours. At the end of this time the solution was evaporated to dryness. It was triturated with ether to give a solid product and crystallized from ethanol-ether.

This ethyl ester hydrochloride was converted to the free base, i.e., L-3-(3,4-dihydroxyphenyl)alanine ethyl ester by treatment with saturated aqueous sodium bicarbonate and extraction into ethyl acetate followed by evaporating to dryness.

EXAMPLE 14

N-benzyloxycarbonyl-L-3-(3,4-dihydroxyphenyl)alanine ethyl ester

Into a 250 ml. 1-necked round-bottomed flask immersed in an ice-salt bath was placed L-3-(3,4-dihydroxyphenyl)alanine ethyl ester hydrochloride (3.5 g., 13.4 mmole) in 134 ml. of 0.1 M NaOH (13.4 mmole). Benzyloxycarbonyl chloride (2.06 g., 12.1 mmole) in ether (25 cc.) and 12.1 ml. of 1.0 M NaOH (12.1 mmole) were added simultaneously with rapid stirring. Stirring continued at —5° for 1 hour and at 25° for 1 hour. The reaction mixture was acidified with 1 M HCl and extracted with ether. The ether layer was extracted with saturated aqueous NaHCO₃, saturated aqueous KCl and 1 M HCl, dried over MgSO₄, filtered and evaporated to dryness to give 3.45 g. of N-benzyloxycarbonyl-L-3-(3,4-dihydroxyphenyl)alanine ethyl ester as a colorless oil.

EXAMPLE 15

N,O,O'-tris-benzyloxycarbonyl-L-3-(3,4-dihydroxyphenyl) alanyl-L-3-(3,4-dihydroxyphenyl)alanine ethyl ester Into a 1-liter 3-necked round-bottomed flask equipped with a mechanical stirrer and immersed in an ice-salt bath was placed N,O,O'-tris-benzyloxycarbonyl-L-3-(3,4-dihydroxyphenyl)alanine (16.0 g., 0.0267 mole, and L-3-(3,4-dihydroxyphenyl)alanine ethyl ester (6.01 g., 0.0267 mole) in 450 ml. of dry tetrahydrofuran. The reaction mixture was cooled and dicyclohexylcarbodiimide (5.5 g., 0.0267 mole) in 30 ml. of tetrahydrofuran was added to each solution. The reaction mixture stirred at 0° for 2 hours and 25° overnight. It was filtered, evaporated to dryness, taken up in ethyl ether, filtered and extracted three times each with saturated NaHCO₃, 2 M citric acid and saturated brine. The ethereal layer was dried over MgSO₄, filtered and evaporated to dryness and gave N,O,O' - tris-benzyloxycarbonyl-L-3-(3,4-dihydroxyphenyl)alanyl-L-3-(3,4-dihydroxyphenyl)alanine ethyl ester.

EXAMPLE 16

L-3-(3,4-dihydroxyphenyl)alanyl - L - 3 - (3,4-dihydroxyphenyl)alanine. Mineral acid hydrolysis of N,O,O'-tris-benzyloxycarbonyl-L-3-(3,4 - dihydroxyphenyl)alanyl-L-3-(3,4-dihydroxyphenyl)alanine ethyl ester A suspension of N,O,O'-tris-benzyloxycarbonyl-L-3-(3,4 - dihydroxyphenyl)alanyl-L-3-(3,4-dihydroxyphenyl)alanine ethyl ester (4.04 g., 0.005 mole) in 100 ml. of 12 M HCl was heated to 37° for 85 minutes. At the end of that time, the reaction mixture was extracted with ether and the aqueous solution evaporated to dryness. The residue was taken up in water and re-evaporated to dryness. This procedure was repeated two more times and L-3-(3,4 - dihydroxyphenyl)alanyl-L-3-(3,4 - dihydroxyphenyl)alanine was finally crystallized from a small volume of water.

EXAMPLE 17

N-benzyloxycarbonyl-L-3-(3,4-dibenzyloxyphenyl)alanine

N - benzyloxycarbonyl-L-3-(3,4 - dihydroxyphenyl)alanine ethyl ester (3.59 g., 0.01 mole), benzyl bromide (5.13 g., 0.03 mole), potassium carbonate (5.53 g., 0.04 mole) and acetone (50 ml.) were heated to reflux for 16 hours. The reaction mixture was evaporated to dryness, taken up in the ethyl acetate and extracted with water. The ethyl acetate layer was dried over MgSO₄, filtered and evaporated to dryness. The product was taken up in 10 ml. of 1 M sodium hydroxide (.01 mole), dioxane (20 ml.) and water (10 ml.) added and the reaction mixture stirred at 25° for 14 hours. Water (100 ml.) added and extracted with diethyl ether three times. The aqueous layer was acidified with cold 1 M H₂SO₄ and extracted three times with ethyl acetate. The ethyl acetate layer was washed with water, dried over MgSO₄, filtered and evaporated to dryness to give N-benzyloxycarbonyl-L-3-(3,4-dibenzyloxyphenyl)alanine.

EXAMPLE 18

N - benzyloxycarbonyl - L - 3 - (3,4 - dibenzyloxyphenyl)alanyl - L - 3 - (3,4 - dihydroxyphenyl)alanine benzyl ester Into a 1 liter 3-necked round-bottomed flask equipped with a mechanical stirrer and imersed in an ice-salt bath was placed N-benzyloxycarbonyl-L-3-(3,4-dibenzyloxyphenyl)alanine (5.12 g., 0.01 mole) and L-3-(3,4-dihydroxyphenyl)alanine benzyl ester (2.87 g., 0.01 mole) in 200 ml. of dry tetrahydrofuran. To the reaction mixture was added 2.06 grams (0.01 mole) of dicyclohexylcarbodiimide. The reaction mixture stirred at 0° for 2 hours and at 25° overnight, filtered, evaporated to dryness, taken up in ethyl ether, filtered and extracted three times each with saturated NaHCO₃, 2 M citric acid and saturated brine. The ethereal layer was evaporated to dryness and gave N-benzyloxycarbonyl-L-3-(3,4-dibenzyloxyphenyl)alanyl-L-3-(3,4-dihydroxyphenyl)alanine benzyl ester.

EXAMPLE 19

L - 3 - (3,4 - dihydroxyphenyl)alanyl - L - 3 - (3,4 - dihydroxyphenyl)alanine. Hydrogenation of N-benzyloxycarbonyl - L - 3 - (3,4 - dibenzyloxyphenyl)alanyl-L-3-(3,4-dihydroxyphenyl)alanine benzyl ester Into a 250 ml. pressure bottle was placed N-benzyloxycarbonyl - L - 3 - (3,4 - dibenzyloxyphenyl)alanyl - L - 3-(3,4-dihydroxyphenyl)alanine benzyl ester (3.91 g., 0.005 mole). Methanol (50 ml.), acetic acid (glacial, 1 ml.) and 1 g. of a mixture containing 5% by weight palladium and 95% by weight barium sulfate were added and the mixture hydrogenated at 40 p.s.i. for 18 hours. It was filtered through Celite, evaporated to dryness, taken up in water and extracted 3 times with ethyl acetate. The aqueous solution was evaporated to dryness, taken up in water, re-evaporated to dryness and finally crystallized from a small volume of water to produce L-3-(3,4-dihydroxyphenyl)alanyl - L - 3 - (3,4 - dihydroxyphenyl) alanine.

EXAMPLE 20

L - 3 - (3,4 - dihydroxyphenyl)alanyl - L - 3 - (3,4 - dihydroxyphenyl)alanine. Boron tribromide cleavage of N - benzyloxycarbonyl - L - 3 - (3,4 - dibenzyloxyphenyl)alanyl - L - 3 - (3,4 - dihydroxyphenyl)alanine benzyl ester Into a 250 ml. 1-necked round-bottom flask was placed N-benzyloxycarbonyl-L-3-(3,4-dibenzyloxyphenyl)alanyl-L - 3 - (3,4-dihydroxyphenyl)alanine benzyl ester (782 mg., 1.0 mmole) in 50 cc. of methylene chloride. Boron tribromide (2.50 g., 10 mmole, 10 equivalents) was added dropwise with stirring and continued to stir at 25° for 14 hours. Water (50 ml.) added and the layers separated. The aqueous layer was retained, washed 3 times with ethyl ether, and evaporated to dryness. The residue was taken up in water, re-evaporated to dryness and finally crystallized from a small volume of water to produce L-3-(3,4-dihydroxyphenyl)alanyl-L-3-(3,4-dihydroxyphenyl)alanine.

EXAMPLE 21

N,O-dicarbobenzoxy-L-tyrosine

L-tyrosine (57.5 g., 0.317 mole) was dissolved in 300 ml. of 2 N NaOH at 0°. Carbobenzoxy chloride (140 g.) and 4 N NaOH solution (400 ml.) were added simultaneously to the stirred solution over a period of 60 minutes. The solution was washed three times with ether and then acidified to pH 2 with 4 N HCl, the white solid mass that formed was taken into 1 liter of methylene chloride and washed in turn with saturated sodium chloride solution and water. Drying over sodium sulfate and evaporating off the solvent gave a crystalline residue. Recrystallization from boiling carbon tetrachloride gave N,O-dicarbobenzoxy-L-tyrosine, melting at 123–126° C.

EXAMPLE 22

N,O-dicarboboenzoxy-3-methoxy-L-tyrosine

Into a 500 ml. 3-necked round-bottomed flask fitted with a mechanical stirrer and immersed in an ice-salt bath was placed 23.7 ml. of 1 N NaOH (23.7 mm.) and water (50 ml.). A stream of nitrogen was passed through the cold stirring solution for 20 minutes and 3-methoxy-L-tyrosine (5.0 g., 23.7 mm.) added. This was followed by simultaneous addition of 1 M NaOH (52.2 ml., 52.2 mm.) and carbobenzoxy chloride (8.9 g., 52.2 mm.) in ether (50 ml) with vigorous stirring over a 30 minute period. Stirring continued at —5° for 1.5 hours and at 25° for 1 hour. It was transferred to a separatory funnel, washed with ether (3× 200 ml.) and the aqueous layer acidified with saturated citric acid and extracted into ether (3× 200 ml.). This latter ethereal solution was washed with water (4× 40 ml.), dried over magnesium sulfate, filtered and evaporated to dryness. The residue was triturated with petroleum ether. Filtration afforded N,O-dicarbobenzoxy - 3 - methoxy - L - tyrosine as white prisms, M.P. 126–129° C.

EXAMPLE 23

N,O,O'-tricarbobenzoxy-D-dopa

N,O,O'-tricarbobenzoxy-D-dopa having an M.P. of 80–85° C .was prepared from D-dopa by the procedure of Example 5.

EXAMPLE 24

O-carbobenzoxy-L-tyrosine benzyl ester hydrochloride

Nine grams (0.022 mole) of N,O-dicarbobenzoxy-L-tyrosine was suspended in 500 ml. ethyl ether, and reacted with 5 g. of phosphorus pentachloride for 60 minutes. The solvent was removed by evaporation and the residue evaporated twice more from diethyl ether. To the oily residue, 100 ml. of 1 N HCl in benzyl alcohol was added and the mixture stirred at 50° C. for 1 hour. Ten volumes of diethyl ether was then added and the product obtained was recrystallized from methanol and diethyl ether to give O-carbobenzoxy-L-tyrosine benzyl ester hydrochloride, M.P. 196–197° C.

EXAMPLE 25

3-methoxy-O-carbobenzoxy-L-tyrosine benzyl ester hydrochloride

Into a 1 liter 3-necked round-bottomed flask was placed N,O-dicarbobenzoxy-3-methoxy-L-tyrosine (6.6 g., 13.8 mm.) in dry chloroform (200 ml.). Nitrogen was flushed through the system and phosphorus pentachloride (2.88 g., 13.8 mm.) added with stirring over a 1 hour period. The reaction mixture was filtered and the filtrate evaporated to dryness. The residue was taken up in dry chloroform (150 ml.) and evaporated to dryness. This process was repeated two more times to give the N-carboxyanhydride of 3-methoxy-O-carbobenzoxy-L-tyrosine as a colorless oil.

The oil was placed in a 1 liter round-bottomed flask fitted with a drying tube and magnetic stirring assembly and treated with a freshly prepared solution of 0.7 M HCl in benzyl alcohol (150 ml.). The reaction mixture was stirred at 50° C. for 35 minutes, cooled to 25° C. and treated with 450 ml. of dry diethyl ether and 900 ml. of petroleum ether. There was obtained a product which was recrystallized from ethanol-ether-petroleum ether to give 3-methoxy-O-carbobenzoxy-L-tyrosine benzyl ester hydrochloride as white crystals, M.P. 76–80° C.

EXAMPLE 26

General method for the coupling of N-carbobenzoxy amino acid O,O'-dicarbobenzoxy-L-dopa benzyl esters The N-carbobenzoxyamino acid and O,O'-dicarbobenzoxy-L-dopa benzyl ester hydrochloride were placed in methylene chloride in a 3-necked round-bottomed flask fitted with a drying tube and mechanical stirring assembly and immersed in an ice bath. Triethylamine (1 equivalent) added followed by dicyclohexylcarbodiimide (1 equivalent). Stirring continued at 0° for 1 hour and 25° overnight. The reaction mixture was filtered, the filtrate evaporated to dryness, taken up in chloroform and extracted with 5% by weight aqueous NaHCO$_3$ and 0.05 M HCl. The chloroform layer was dried over MgSO$_4$, filtered, evaporated to dryness and crystallized.

EXAMPLE 27

N-carbobenzoxyglycyl-O,O'-dicarbobenzoxy-L-dopa benzyl ester

In the manner of Example 26, carbobenzoxyglycine (1.07 g., 5.1 mm.) and O,O'-dicarbobenzoxy-L-dopa benzyl ester hydrochloride (3.0 g., 5.1 mm.) in methylene chloride (50 ml.)-dimethylformamide (1.4 ml.) was reacted with triethylamine (516 mg., 5.1 mm.) and dicyclohexylcarbodiimide (1.07 g., 5.1 mm.). There was obtained N-carbobenzoxyglycyl-O,O'-dicarbobenzoxy-L-dopa benzyl ester as a colorless oil.

EXAMPLE 28

N,O-dicarbobenzoxy-3-methoxy-L-tyrosyl-O,O'-dicarbobenzoxy-L-dopa benzyl ester

In the manner of Example 26 N,O-dicarbobenzoxy-3-methoxy-L-tyrosine (2.40 g., 5.0 mm.) and O,O'-dicarbobenzoxy-L-dopa benzyl ester hydrochloride (2.96 g., 5.0 mm.) in methylene chloride (125 ml.) was reacted with triethylamine (507 mg., 5.0 mm.) and dicyclohexylcarboodiimide (1.05 g., 5.1 mm.). There was obtained N,O - dicarbobenzoxy-3-methoxy-L-tyrosyl-O,O'-dicarbobenzoxy-L-dopa benzyl ester as a white crystalline product after crystallization from ethyl acetate - ether, $[\alpha]_D^{25}$ —11.09 (c.=2.1 percent, chloroform).

EXAMPLE 29

N,O-dicarbobenzoxy-L-tyrosyl-O,O'-dicarbobenzoxy-L-dopa-benzyl ester

N,O-dicarbobenzoxy-L-tyrosine (4.2 g.; 0.0094 mole) and 5.6 g. (0.0094 mole) of O,O'-dicarbobenzoxy-L-dopa benzyl ester hydrochloride were coupled in the manner of Example 26 in 60 ml. of methylene chloride with 2.13 g. of dicyclohexylcarbodiimide in the presence of 1.33 ml. triethylamine as described earlier. After filtration of the insoluble urea, the filtrate was washed with water and dried over $Na_2SO_4$. Evaporation of the solvent left a solid mass which was recrystallized from ethyl acetate and petroleum ether to give N,O-dicarbobenzoxy-L-tyrosyl-O,O'-dicarbobenzoxy-L-dopa benzyl ester melting at 120–123°.

EXAMPLE 30

N-carbobenzoxy-L-alanyl-O,O'-dicarbobenzoxy-L-dopa benzyl ester

Carbobenzoxy-L-alanine (5.6 g.; 0.025 mole) and O,O' - dicarbobenzoxy-L-dopa benzyl ester hydrochloride (15 g., 0.25 mole) were coupled in the manner of Example 26 in methylene chloride with dicyclohexylcarbodiimide (5.15 g., 0.025 mole) and 3.55 ml. triethylamine and worked up in the manner of Example 26 to give N-carbobenzoxy-L-alanyl - O,O' - dicarbobenzoxy - L - dopa benzyl ester M.P. 132–135°.

EXAMPLE 31

N-carbobenzoxy-L-leucyl-O,O'-dicarbobenzoxy-L-dopa benzyl ester

O,O' - dicarbobenzoxy-L-dopa benzyl ester hydrochloride (8.88 g., 0.015 mole) and carbobenzoxy-L-leucine (3.98 g., 0.015 mole) were coupled in the manner of Example 26 in the presence of dicyclohexylcarbodiimide (3.4 g.) and 2.12 ml. triethylamine in 70 ml. $CH_2Cl_2$. The reaction mixture was worked up in the manner of Example 26 to give N-carbobenzoxy-L-leucyl - O,O' - dicarbobenzoxy-L-dopa benzyl ester M.P. 105–108°.

EXAMPLE 32

N,O,O'-tricarbobenzoxy-D-dopa-O,O'-dicarbobenzoxy-L-dopa benzyl ester

In the manner of Example 26, N,O,O'-tricarbobenzoxy-D-dopa (4.8 g., 8.0 mm.) and O,O'-dicarbobenzoxy-L-dopa benzyl ester hydrochloride (4.75 g., 8.0 mm.) in methylene chloride (225 ml.) was reacted with triethylamine (804 mg., 8.0 mm.) and dicyclohexylcarbodiimide (1.66 g., 8.05 mm.). After crystallization from ethyl acetate-petroleum ether there was obtained N,O,O'-tricarbobenzoxy-D-dopa-O,O'-dicarbobenzoxy - L - dopa benzyl ester as white prisms M.P. 154–160°.

EXAMPLE 33

N-carbobenzoxy-γ-benzyl-L-glutamyl-O,O'-dicarbobenzoxy-L-dopa benzyl ester

In the manner of Example 31 N-carbobenzoxy-γ-benzyl-L-glutamate (3.72 g., 10 mm.) and O,O'-dicarbobenzoxy-L-dopa benzyl ester hydrochloride (5.92 g., 10 mm.) in methylene chloride (75 ml.) was reacted with triethylamine (1.40 ml., 10 mm.) and dicyclohexylcarbodiimide (2.06 g., 10 mm.). The reaction product was N-carbobenzoxy-γ-benzyl-L-glutamyl - O.O' - dicarbobenzoxy-L-dopa benzyl ester. This was white crystalline product after crystallization from ethyl acetate-petroleum ether, $[\alpha]_D^{25}$ —10.70° (c.=1 percent, methanol).

EXAMPLE 34

General method for the preparation of N,O,O'-tricarbobenzoxy-L-dopa-amino acid benzyl esters N,O,O' - tricarbobenzoxy-L-dopa and the amino acid benzyl ester hydrochloride were placed in methylene chloride in a 3-necked round-bottom flask fitted with a mechanical stirring assembly and immersed in an ice-bath. Triethylamine (1 equivalent) added followed by dicyclohexylbarbodiimide (1 equivalent). Stirring continued at 0° for 1 hour and 25° overnight. The reaction mixture was filtered, the filtrate evaporated to dryness, taken up in chloroform and extracted with 5 percent by weight aqueous $NaHCO_3$ and 0.05 M HCl. The chloroform layer was dried over $MgSO_4$, filtered, evaporated to dryness and crystallized.

EXAMPLE 35

N,O,O'-tricarbobenzoxy-L-dopa-glycine benzyl ester

By the procedure of Example 32 N,O,O'-tricarbobenzoxy-L-dopa (7.44 g. 12.4 mm.) was reacted with glycine benzyl ester and hydrochloride (2.5 g., 12.4 mm.) in methylene chloride (275 ml.) and dimethylformamide (12 ml.). Triethylamine (1.25 g., 12.4 mm.) and dicyclohexylcarbodiimide (2.6 g., 12.4 mm.) was added and the reaction mixture was evaporated to dryness, taken up in methylene chloride and worked up in the manner of Example 32. N,O,O'-tricarbobenzoxy-L-dopa-glycine benzyl ester crystallized from methylene chloridehexane as white prisms, M.P. 90–91°.

EXAMPLE 36

N,O,O'-tricarbobenzoxy-L-dopa-3-methoxy-O-carbobenzoxy-L-tyrosine benzyl ester

By the procedure of Example 32, N,O,O'-tricarbobenzoxy-L-dopa (3.18 g., 5.3 mm.) and 3-methoxy-O-carbobenzoxy-L-tyrosine benzyl ester hydrochloride (2.50 g., 5.3 mm.) in methylene chloride (125 ml.) was reacted with triethylamine (537 mg., 5.3 mm.) and dicyclohexylcarbodiimide (1.135 g., 5.5 mm.). N,O,O'-tricarbobenzoxy-L-dopa - 3 - methoxy-O-carbobenzoxy - L - tyrosine benzyl ester crystallized from ethyl acetate-petroleum ether, M.P. 156–160°.

EXAMPLE 37

N,O,O'-tricarbobenzoxy-L-dopa-O-carbobenzoxy-L-tyrosine benzyl ester

N,O,O'-tricarbobenzoxy-L-dopa (6.9 g.: 0.0115 mole) and O-carbobenzoxy-L-tyrosine benzyl ester hydrochloride (5.1 g.; 0.0115 mole) were coupled by the procedure of Example 32 in the presence of 2.61 g. of dicyclohexylcarbodiimide and 1.63 ml. triethylamine in a mixture of 100 ml. methylene chloride and 60 ml. dimethylformamide. The reaction mixture was worked up as by the procedure of Example 32 to give N,O,O'-tricarbobenzoxy-L-dopa-O-carbobenzoxy-L-tyrosine benzyl ester, M.P. 90–93°.

EXAMPLE 38

General method for the preparation of free dipeptides

The protected dipeptide was dissolved in glacial acetic acid: methanol, the catalyst (5 percent Pd on $BaSO_4$) added and the mixture hydrogenated in a Parr apparatus at 35–50 p.s.i. The catalyst was removed by filtration through Celite and the filtrate evaporated to dryness, evaporated from water and crystallized.

EXAMPLE 39

Glycyl-L-dopa

By the procedure of Example 38, N-carbobenzoxyglycyl-O,O'-dicarbobenzoxy-L-dopa benzyl ester (25.6 g., 34.3 mm.) in 11:1 by volume mixtures of methanol: glacial acetic acid (240 ml.) was treated with 8.0 g. of 5 percent Pd-$BaSO_4$ and hydrogenated at 47.5 p.s.i. for 1 hour. The mixture was filtered, evaporated to dryness, taken up in water, evaporated and crystallized from water-isopropanol. There was obtained glycyl-L-dopa as white prisms, M.P. 170–174°, which resolidified and melted again 261–265°.

EXAMPLE 40

3-methoxy-L-tyrosyl-L-dopa

By the procedure of Example 38, N,O-dicarbobenxoxy-3-methoxy-L-tyrosyl-O,O'-dicarbobenzoxy-L-dopa benzyl ester (2.85 g., 2.8 mm.) in methanol:glacial acetic acid:tetrahydrofuran (50 ml.:5 ml.:30 ml.) was hydrogenated at 36.5 p.s.i. for 16 hours. The mixture was filtered, evaporated to dryness, taken up in water, evaporated and crystallized from water-isopropanol. There was obtained 3-methoxy-L-tyrosyl-L-dopa as white prisms, M.P. 164–166°.

EXAMPLE 41

L-tyrosyl-L-dopa

N,O-dicarbobenzoxy - L - tyrosyl-O,O'-dicarbobenzoxy-L-dopa benzyl ester (3.5 g., 0.0035 mole) was dissolved in a mixture of 18 ml. tetrahydrofuran 20 ml. methanol and 2 ml. acetic acid and hydrogenated at 45 p.s.i. in the presence of 1.5 g. of 5 percent $Pd/BaSO_4$ catalyst overnight. Removal of the catalyst and solvent by filtration and evaporation gave 2.45 g. of oily residue which on trituration in methanol started to crystallize. Recrystallization from hot methanol gave L-tyrosyl-L-dopa as colorless needles, M.P. 169–171°.

EXAMPLE 42

L-alanyl-L-dopa

Carbobenzoxy-L-alanyl-O,O'-dicarbobenzoxy - L - dopa benzyl ester (9.6 g., 0.0126 mole) was hydrogenated in a mixture of 100 ml. methanol, 100 ml. tetrahydrofuran and 10 ml. acetic acid at 44 p.s.i. for 6 hours in the presence of 4 g. of catalyst. The reaction mixture was worked up in the manner of Example 38 to give L-alanyl-L-dopa.

EXAMPLE 43

L-leucyl-L-dopa

N - carbobenzoxy-L-leucyl - O,O' - dicarbobenzoxy-L-dopa benzyl ester (6.58 g., 0.0082 mole) was hydrogenated in the manner of Example 38 with 2 g. of catalyst overnight at 47 p.s.i. The reaction mixture was worked up in the manner of Example 36 to produce L-leucyl-L-dopa which was dissolved in boiling isopropanol. Amorphous solid formed slowly on standing several days.

EXAMPLE 44

D-dopyl-L-dopa

The protected dipeptide N,O,O'-tricarbobenzoxy-D-dopa-O,O'-dicarbobenzoxy-L-dopa benzyl ester (5.7 g., 5.0 mm.) in methanol:acetic acid:tetrahydrofuran (135 ml.: 15 ml.: 100 ml.) was hydrogenated at 40 p.s.i. for 15 hours by the procedure of Example 38. The mixture was filtered, evaporated to dryness and evaporated several times from water. The residue was crystalized from water-isopropanol. The product was taken up in water and extratced with ethyl acetate and ether. The aqueous layer was bubbled with nitrogen and lyophilized. There was obtained D-dopyl-L-dopa as white prisms, M.P. 171–1750.

EXAMPLE 45

α-L-glutamyl-L-dopa

N - carbobenzoxy - γ-benzyl-L-glutamyl-O,O'-dicarbobenzoxy-L-dopa benzyl ester (6.05 g., 6.65 mm.) in methanol:acetic acid:tetrahydorfuran (45 ml.:5 ml.:30 ml.) was hydrogenated at 50 p.s.i. for 5 hours in the manner of Example 38. The mixture was filtered, evaporated to dryness and evaporated once from water. The residue was taken up in water, extracted with ether and evaporated to dryness. The residue crystallized from water-ethanol. There was obtained α-L-glutamyl-L-dopa as white crystalline product, M.P. 163–165°.

EXAMPLE 46

L-dopyl-glycine

N,O,O'-tricarbobenzoy-L-dopa-glycine benzyl ester (5.4 g., 7.22 mm.) in methanol-acetic acid:tetrahydorfurane (50 ml:5 ml.:120 ml.) was hydrogenated at 40 p.s.i. for 20 hours in the manner of Example 38. The mixture was filtered, evaporated to dryness, evaporated several times from water and crystallized from water-isopropanol. There was obtained L-dopyl-glycine as white prisms M.P. 159–161°, which resolidifies and melts at 262–265° dec.

EXAMPLE 47

L-dopyl-3-methoxy-L-tyrosine

N,O,O' - tricarbobenzoxy - L-dopa-3-methoxy-O-carbobenzoxy-L-tyrosine benzyl ester (3.0 g., 2.95 mm.) in methanol:acetic acid:tetrahydrofuran (50 ml.:5 ml.:50 ml.) was hydrogenated at 35 p.s.i. for 16 hours in the manner described in connection with Example 38. The mixture was filtered, evaporated to dryness, evaporated several times from water and crystallized from water-isopropanol. There was obtained L-dopyl-3-methoxy-L-tyrosine as a white solid, M.P. 164–167°.

EXAMPLE 48

L-dopyl-L-tyrosine

N,O,O' - tricarbobenzoxy - L-dopa-O-carbobenzoxy-L-tyrosine benzyl ester (5.5 g., 0.0056 mole) was hydrogenated and worked up in the manner of Example 38 to give a solid. It was dissolved in a small amount of water and approximately 10 volumes of isopropanol was added. After standing several days L-dopyl-L-tyrosine of amorphous solid was obtained, M.P. 178–180°.

EXAMPLE 49

Preparation of N,O,O'-tricarbobenzoxy-L-dopa

Into a three neck round bottom flask fitted with mechanical stirrer and a nitrogen gas inlet tube was added 710.8 ml. of N NaOH and 1480 ml. water. The solution was chilled in an ice-salt bath and nitrogen gas bubbled for 30 minutes. L-Dopa (140 g., 0.71 mole) was introduced and the solution was stirred vigorously while 404 g. of benzyloxycarbonylchloride (diluted to 2370 ml. with ethyl ether) and 2370 ml. N NaOH were added simultaneously from two separate dropping funnels under nitrogen during a period of 75 minutes. After stirring an additional hour in the ice bath and two hours at room temperature, the crystalline sodium salt formed. It was collected by suction on coarse glass filter, washed thoroughly with ether and then water to give a white solid mass. The solid was then partitioned between 2 l each of methyl ether and 1 M citric acid. The ether layer was washed thoroughly with water, dried over $Na_2SO_4$ and evaporated to give a clear oil. The compound N,O,O'-tricarbobenzoyl-L-dopa was crystallized from a small volume of $CH_2Cl_2$ with petroleum ether (30–60° B.P.). M.P., 82–84°.

EXAMPLE 50

O,O'-dicarbobenzoxy-L-dopa benzyl ester hydrochloride

A solution of N,O,O'-tricarbobenzoxy-L-dopa (230 g., 0.385 mole) in 5.3 l. of anhydrous diethyl ether was reacted with 97.4 g. (0.47 mole) of phosphorus pentachloride. The clear solution obtained was evaporated under reduced pressure with exclusion of moisture. The residue obtained was evaporated once more with diethyl ether and again with ethyl acetate to give O,O'-dicarbobenzoxy-L-dopa-N-carboxy anhydride as a colorless syrup. This compound was immediately reacted with 690 ml. of N HCl in benzyl alcohol at 50° C. for 30 minutes. As soon as the evolution of $CO_2$ gas was no longer evident, 15 volumes of dry diethyl ether were added and the mixture allowed to stand overnight. The product formed was recrystallized from methanol with diethyl ether to give O,O'-dicarbobenzoxy-L-dopa benzyl ester hydrochloride M.P. 114–117°.

EXAMPLE 51

The reaction of Example 50 can also be carried out satsifactorily with CHCl₃ as solvent instead of diethyl ether. The solubility of the starting material seemed to be greater in CHCl₃ than ethyl ether. Thus 5 g. (0.0083 mole) N,O,O' - tricarbobenzoxy-L-dopa was dissolved in 10 ml. of CHCl₃. Phosphorous pentachloride (2.1 g., 0.01 mole) was added slowly with cooling. The mixture was then stirred at room temperature for 30 min. until almost all of the PCl₅ went into solution. A small amount of insoluble material was filtered off and the filtrate was evaporated under reduced pressure (exclusion of moisture) to a heavy syrup. It was evaporated once more with fresh ether and again with ethyl acetate. The oily residue was treated immediately with 15 ml. of freshly prepared N HCl in benzyl alcohol and stirred at 50° for 30 minutes. Fifteen volumes of diethyl ether was added and the mixture allowed to stand overnight after which a heavy solid formed. Recrystallization from methanol with diethyl ether gave O,O'-dicarbobenzyloxy-L-dopa benzyl ester hydrochloride M.P. 108–111°. TLc indicated that the product was identical with that obtained above from the reaction carried out in anhydrous diethyl ether as in Example 49.

EXAMPLE 52

N,O,O'-tricarbobenzoxy-L-dopyl-O,O'-dicarbobenzoxy-L-dopa benzyl ester

A solution containing 106 g. (0.178 mole) of O,O'-dicarbobenzoxy-L-dopa benzyl ester hydrochloride in 400 ml. CH₂Cl₂ was chilled in an ice bath and neutralized with 24.4 ml. of triethylamine. Some solid triethylammonium hydrochloride formed at this point. Without too much delay, 112 g. (0.178 mole) of N,O,O'-tricarbobenzoxy-L-dopa dissolved in 400 ml. of chilled CH₂Cl₂ was added followed by 39.2 g. (0.19 mole) of dicyclohexylcarbodiimide. The reaction mixture was stirred at 0° for 1 hour and two hours at room temperature. The insoluble dicyclohexylurea and triethylammonium hydrochloride were removed by suction filtration and washed several times with small portions of CH₂Cl₂. The combined filtrate and washings were washed with water, dried over Na₂SO₄ and evaporated to dryness. The crude oil obtained was dissolved in a small volume of CH₂Cl₂ and filtered to remove some more dicyclohexylurea. Evaporation of the filtrate under reduced pressure gave clear oil. This oil was crystallized from a minimum volume of CH₂Cl₂ with petroleum ether (B.P. 30–60°) to give N,O,O'-tricarbobenzoxy-L-dopa - O,O' - dicarbobenzoxy-L-dopyl benzyl ester melting at 102–108°.

EXAMPLE 53

L-dopyl-L-dopa

N,O,O'-tricarbobenzoxy-L-dopa-O,O' - dicarbobenzoxy-L-dopa benzyl ester (144 g., 0.127 mole) was dissolved in a solvent mixture (800 ml.) containing peroxide free THF methanol and acetic acid in the ratio of 6:9:1 parts by volume. The catalyst (40 g., 5 percent Pd on BaSO₄) was added and the mixture hydrogenated in a Parr apparatus at 45 p.s.i. for 5 hours. The catalyst was then removed by filtration and the filtrate evaporated to give a hard oil which on treatment with 400 ml. abs. ethanol started to crystallize slowly (2–3 days) giving crude didopa, M.P. 167–170°. Recrystallization from hot ethanol gave L-dopyl-L-dopa melting at 174–176°.

EXAMPLE 54

N-carbobenzoxy-L-prolyl-O,O'-dicarbobenzoxy-L-dopa benzyl ester

In the manner of Example 26, carbobenzoxy-L-proline (1.28 g., 5.1 mm.) and O,O'-dicarbobenzoxy-L-dopa benzyl ester hydrochloride (3.0 g., 5.1 mm.) in methylene chloride (50 ml.)-dimethylformamide (1.4 ml.) was reacted with triethylamine (516 mg., 5.1 mm.) and dicyclohexylcarbodiimide (1.07 g., 5.1 mm.). There was obtained N-carbobenzoxy-L-prolyl-O,O'-dicarbobenzoxy - L - dopa benzyl ester.

EXAMPLE 55

N,N'-dicarbobenzoxy-L-lysyl-O,O'-dicarbobenzoxy-L-dopa benzyl ester

By the procedure of Example 26, N,N' - dicarbobenzoxy-L-lysine (2.12 g., 5.1 mm.) was reacted with O,O'-dicarbobenzoxy-L-dopa to produce N,N' - dicarbobenzoxy-L-lysyl-O,O' - dicarbobenzoxy - L - dopa benzyl ester, M.P. 139°–141° C.

EXAMPLE 56

L-prolyl-L-dopa

By the procedure of Example 38, N-carbobenzoxy-L-prolyl-O,O'-dicarbobenzoxy-L - dopa benzyl ester is converted to L-prolyl-L-dopa, white prisms, M.P. 170° C. dec.

EXAMPLE 57

L-lysyl-L-dopa

By the procedure of Example 38, N,N-dicarbobenzoxy-L-lysyl-O,O'-dicarbobenzoxy-L-dopa benzyl ester is converted to L-lysyl-L-dopa.

EXAMPLE 58

L-pyroglutamyl-O,O'-dicarbobenzoxy-L-dopa benzyl ester

In the manner of Example 26, L-pyroglutamic acid and O,O'-dicarbobenzoxy-L-dopa benzyl ester hydrochloride, were reacted to produce L-pyroglutamyl-O,O' - dicarbobenzoxy-L-dopa benzyl ester as white prisms, M.P. 133 to 136° C.

EXAMPLE 59

L-pyroglutamyl-L-dopa

By the procedure of Example 38, L-pyroglutamyl-O,O'-dicarbobenzoxy - L - dopa benzyl ester was hydrogenated to produce L-pyroglutamyl-L-dopa as white powder, M.P. 120° C. dec.

EXAMPLE 60

N-carbobenzoxy-L-seryl-O,O'-dicarbobenzoxy-L-dopa benzyl ester

N-carbobenzoxy-L-serine (2.40 g., 0.01 mole) and O,O'-dicarbobenzoxy - L - dopa benzyl ester hydrochloride were dissolved in methylene chloride (50 ml.) and placed in a 250 ml. 3-necked round bottomed flask fitted with a magnetic stirrer and immersed in an ice-salt bath. Triethylamine (1.40 cc., 0.01 mole) was added followed by dicyclohexylcarbodiimide (2.06 g., 0.01 mole). Stirring continued at 0° C. for 2 hours and 25° C. overnight. The reaction mixture was filtered and the filtrate extracted with an aqueous solution containing 5% by weight of NaHCO₃ and 1 M aqueous citric acid, dried over MgSO₄, filtered, evaporated to dryness and crystallized from ethyl acetate-petroleum ether. There was obtained N-carbobenzoxy-L-seryl-O,O'-dicarbobenzoxy - L - dopa benzyl ester as white prisms, M.P. 150–153° C.

EXAMPLE 61

N-carbobenzoxy-L-valyl-O,O'-dicarbobenzoxy-L-dopa benzyl ester

N-carbobenzoxy-L-valine (2.52 g., 0.01 mole) and O,O'-dicarbobenzoxy-L - dopa benzyl ester hydrochloride (5.92 g., 0.01 mole) were dissolved in methylene chloride (50 cc.). Triethylamine (1.40 cc., 0.01 mole) was added followed by dicyclohexylcarbodiimide (2.06 g., 0.01 mole) and stirred at 0° C. for 2 hours and 25° C. overnight. The reaction mixture was filtered and the filtrate extracted with an aqueous solution containing 5% by weight of NaHCO₃ and 1 M aqueous citric acid, dried over MgSO₄, filtered, evaporated to dryness and crystallized from ethyl acetate-petroleum ether. There was obtained N-carbobenzoxy-L-valyl-O,O'-dicarbobenzoxy - L-dopa benzyl ester as white prisms, M.P. 105–108° C.

EXAMPLE 62

N-t-butyloxycarbonyl-α-benzyl-L-glutamyl-O,O'-dicarbobenzoxy-L-dopa benzyl ester N-t-butyloxycarbonyl-α-benzyl-L-glutamate (3.37 g., 0.01 mole) and O,O'-dicarbobenzoxy-L-dopa benzyl ester hydrochloride (5.92 g., 0.01 mole) were placed in a system described in Example 60. The reaction mixture was cooled to 0° C. and triethylamine (1.40 cc., 0.01 mole) added followed by dicyclohexylcarbodiimide (2.05 g., 0.01 mole) and stirred at 0° C. for 2 hours and 25° C. overnight. The reaction mixture was filtered, extracted with an aqueous solution containing 5% by weight NaHCO₃ and 1 M aqueous citric acid, dried over MgSO₄, filtered and evaporated to dryness. The residue was crystallized from ethyl acetate-petroleum ether and produced N-t-butyloxycarbonyl-α-benzyl-L-glutamyl - O,O' - dicarbobenzoxy-L-dopa benzyl ester as white crystalline product, M.P. 82–85.5° C.

EXAMPLE 63

N,O,O'-tricarbobenzoxy-L-dopyl-N^ε-carbobenzoxy-L-lysine-t-butyl ester

N,O,O'-tricarbobenzoxy-L-dopa (12.0 g., 0.02 mole) and N^ε-carbobenzoxy-L-lysine t-butyl ester hydrochloride (7.50 g., 0.02 mole) were placed in the system set forth in Example 60. The mixture was cooled to 0° C. and triethylamine (2.80 cc., 0.02 mole) was added followed by dicyclohexylcarbodiimide (4.12 g., 0.02 mole) and stirred at 0° C. for one hour and 25° C. overnight. The reaction mixture was worked up in the manner described in Example 60, and the product crystallized from ethyl acetate-petroleum ether. There was obtained N,O,O'-tricarbobenzoxy - L-dopyl-N^ε-carbobenzoxy-L-lysine-t-butyl ester as white prisms, M.P. 87.5–90.5° C.

EXAMPLE 64

L-seryl-L-dopa

By the procedure of Example 38, N-carbobenzoxy-L-seryl-O,O'-dicarbobenzoxy-L-dopa benzyl ester (5.2 g., 6.70 mmole) in tetrahydrofuran:glacial acetic acid:methanol (20 ml.:20 ml.:20 ml.) was hydrogenated at 45 p.s.i. for 6 hours using 3.0 g. of 5% Pd-BaSO₄ as catalyst and the reaction crystallized from water-isopropanol. There was obtained L-seryl-L-doda as white prisms, M.P. 149° C.

EXAMPLE 65

L-valyl-L-dopa

By the procedure of Example 38, N-carbobenzoxy-L-valyl-O,O'-dicarbobenzoxy-L-dopa benzyl ester (5.7 g., 7.23 mmole) in tetrahydrofuran:acetic acid:methanol (20 ml.:20 ml.:50 ml.) was hydrogenated at 45 p.s.i. for 5 hours using 3.5 g. of 5% Pd-BaSO₄. The product was crystallized from ethanol-water. There was obtained L-valyl-L-dopa as white prisms, M.P. 156° C.

EXAMPLE 66

L-γ-glutamyl-L-dopa

The protected dipeptide N - t - butyloxycarbonyl-α-benzyl-L-glutamyl-O,O' - dicarbobenzoxy-L-dopa benzyl ester (4.1 g., 4.69 mmole) in methanol:acetic acid (50 ml.:10 ml.) was hydrogenated at 48 p.s.i. for 5½ hours using 4.2 g. of 5% Pd-BaSO₄ and was worked in the manner of Example 38. The residue was triturated with diethyl ether and treated with a solution of trifluoroacetic acid:methylene chloride (25 ml.:25 ml.) and stirred at 25° C. for 30 minutes. It was evaporated to dryness and the residue evaporated several times from water, taken up in ethanol and triethylamine added to pH 7. The resultant precipitate was filtered, washed with ethanol and crystallized from ethanol-water. There was obtained L-δ-glutamyl-L-dopa as a white amorphous solid.

EXAMPLE 67

L-dopyl-L-lysine trifluoroacetate

The dipeptide N,O,O'-tricarbobenzoxy-L-dopyl-N^ε-carbobenzoxy-L-lysine-t-butyl ester (7.6 g., 8.28 mmole) in methanol:acetic acid (125 ml.:10 ml.) was hydrogenated at 50 p.s.i. for 48 hours using 5.0 g. of 5% Pd-BaSO₄ and worked up in the manner of Example 38. The residue was crystallized from ethanol to give 4.1 g. of intermediate, L-dopyl-L-lysine t-butyl ester. A solution of 2.0 g. of the intermediate was reacted with trifluoroacetic acid: methylene chloride (40 ml.:40 ml.) and stirred at 25° C. for 2¼ hours. It was evaporated to dryness, taken up in methanol and precipitated with isopropanol. There was obtained L-dopyl-L-lysine trifluoroacetate as a white solid.

EXAMPLE 68

L-prolyl-L-dopa-L-dopa

Twenty-five ml. of dimethylformamide was chilled in an ice-bath and bubbled with nitrogen for 15 minutes while L-dopa-L-dopa (1.8 g., 4.8 mm.) was added. After the solid dissolved, 1.8 g. (4.9 mm.) of N-carbobenzoxy-L-proline p-nitrophenyl ester was added followed by 0.68 ml. of triethylamine. The mixture was stirred at 0° C. for 2 hours and 22 hours at room temperature. The reaction mixture was then acidified with 1 ml. of acetic acid and the solvent removed by evaporation under reduced pressure. The residual pale yellowish oil was triturated with diethyl ether and precipitated from a small volume of methanol with diethyl ether to give 2.1 g. of crude partially protected tripeptide. A portion of this material (1.2 g.) was stirred overnight in a mixture of 50 ml. each of water and methylene chloride under nitrogen and the water layer was lyophilized to give 0.8 g. of white powder. It was dissolved in 30 ml. of solvent mixture (methanol:water:acetic acid; 10:10:1) and hydrogenated overnight at 50 p.s.i. with 0.35 g. of 5% Pd on BaSO₄ as catalyst. The catalyst was removed by filtration and the filtrate evaporated to a slightly colored oil which on treatment with 40 ml. of methanol gave crystalline solid (0.55 g.). It was then recrystallized from hot water and isopropanol to give L-pyrolyl-L-dopa-L-dopa, M.P. 260–261° C.

EXAMPLE 69

L-3-(3,4-dihydroxyphenyl)alanylglycylglycine

Into a 250 ml. 1-necked round bottomed flask fitted with a magnetic stirrer was placed N,O,O'-tricarbobenzoxy-L-dopa-p-nitrophenyl ester (5.05 g., 7.0 mmoles) and glycylglycine hydrochloride monohydrate (1.24 g., 6.66 mmoles). There was added 50 ml. dimethylformamide (dried over molecular sieve "Linde" Type 4A, 4–8 mesh). The insoluble reaction mixture was chilled at 0° for 20 minutes and triethylamine (1.35 g., 13.3 mmoles) was added. The yellow mixture was stirred at 0° C. for 2 hours at 25° C. for 90 hours.

The reaction mixture was filtered, treated with 1.5 ml. glacial acetic acid and the solution was evaporated in vacuo at 35° to remove the dimethylformamide. The residual oil was triturated with anhydrous ethyl ether (five times), dissolved in warm ethyl acetate, chilled and removed some salt by filtration. The filtrate was evaporated to dryness and the residual oil was dissolved in aqueous solution containing 5% by weight sodium bicarbonate and washed with ethyl ether. The aqueous phase was slowly acidified with 1 M aqueous hydrochloric acid to afford an off-white gummy precipitate which was dissolved in ethyl acetate and washed with saturated sodium chloride. It was dried over MgSO₄, filtered and evaporated to dryness to afford N,O,O'-trisbenzyloxycarbonyl-L-3-(3,4-dihydroxyphenyl)alanylglycylglycine as a pale-yellow amorphous solid.

A solution of 3.7 g. of this solid in 140 ml. of 10% by volume acetic acid in methanol was placed into a 500 ml. "pressure" bottle. There was added 0.8 g. of 5% by weight palladium on 95% by weight barium sulfate and the mixture was hydrogenated for 5½ hours at an initial pressure of 41 p.s.i. The mixture was filtered over a methanol moistened pad of Celite and the filtrate evaporated to dryness. The residual oil was dissolved in distilled water which was pre-treated with argon for 20 minutes, filtered and evaporated to dryness. This process was repeated twice and the residual oil was dissolved in a minimum of the argon treated water and an excess of isopropanol was added slowly. It was allowed to stand for 2 hours and a colorless solution (B) was decanted from a violet oil (A). Solution B was chilled at 0° overnight to afford a white crystalline precipitate which was collected by filtration and washed with 20% by volume water in 80% by volume of isopropanol and isopropanol. It was dried in vacuo to afford L-3-(3,4-dihydroxyphenyl) alanylglycylglycine as white crystals, M.P. 180–182° C.

In order to obtain additional amounts of product, the violet oil (A) was treated with a small volume of the argon treated water and a white crystalline solid precipitated. The solid was collected by filtration and washed with 20% by volume of water in isopropanol, isopropanol and anhydrous ethyl ether. The product was dried in vacuo to afford L-3-(3,4-dihydroxyphenyl)alanylglycylglycine as a white crystalline solid, M.P. 186–188° C.

EXAMPLE 70

Glycyl-L-3-(3,4-dihydroxyphenyl)alanylglycine

Into a 250 ml. 1-necked round bottomed flask, fitted with a magnetic stirrer was placed L-3-(3,4-dihydroxyphenyl)alanylglycine (3.0 g., 11.8 mmoles) and 120 ml. dimethylformamide was added. To this insoluble mixture was added N-carbobenzoxyglycine p-nitrophenyl ester (3.98 g., 12.0 mmoles) and the reaction mixture was chilled in ice for 20 minutes and treated with triethylamine (1.195 g., 11.8 mmoles). The solution turned yellow and most of the solids dissolved, stirring continued at 0° C. for 2 hours and at 25° C. for 20 hours to give a clear yellow solution.

At the end of this time 1.5 ml. of glacial acetic acid was added and the solution was evaporated in vacuo at 35° C. to remove the dimethylformamide. The residual oil was triturated with anhydrous ethyl ether (three times). The oil was dissolved in methanol, precipitated slowly with anhydrous ethyl ether, decanted and the precipitated oil was dissolved in boiling absolute ethanol (about 200 ml.). It was filtered by gravity and chilled at 0° C. overnight. Some starting dipeptide was removed by filtration and the filtrate was combined with the first methanol diethyl ether filtrate and evaporated to dryness. The residual oil was treated with ethyl acetate. There was obtained 1.4 g. of a white amorphous precipitate of dipeptide starting material. The mother liquor was evaporated to dryness and the residual oil dissolved in aqueous 5% by weight sodium bicarbonate and washed with ethyl acetate. The aqueous layer was treated with a trace of sodium hydrosulfite to prevent oxidation and filtration. It was washed twice with ethyl acetate and acidified with 1 M aqueous hydrochloric acid and extracted into ethyl acetate (three times). The combined ethyl acetate extract was dried over MgSO₄, filtered and evaporated to dryness to afford N-carbobenzoxy-glycyl-L-3-(3,4-dihydroxyphenyl)alanylglycine as an oil.

A solution of 1.3 g. of this oil in 50 ml. of 10% by volume acetic acid in 90% by volume methanol was placed into a 250 ml. "pressure" bottle. There was added 0.7 g. of 5% by weight palladium on 95% by weight barium sulfate and the mixture was hydrogenated for 4 hours at an initial pressure of 50 p.s.i. The mixture was filtered over a methanol moistened pad of Celite (diatomaceous earth) and the filtrate evaporated to dryness. The yellow residual oil was dissolved in distilled water which was pre-treated with argon for 20 minutes. It was washed with ethyl acetate (two times) and ethyl ether and evaporated to dryness. The residual oil was dissolved in a minimum volume of the argon treated water, filtered and treated with isopropanol until cloudy. It was chilled at 0° C. overnight and the precipitate was collected by filtration, washed with 20% by volume water 80% by volume isopropanol, isopropanol and ethyl ether and dried in vacuo to afford glycyl-L-3-(3,4-dihydroxyphenyl)alanylglycine as white crystals, M.P. 217–220° C.

EXAMPLE 71

Glycyl-glycyl-L-3-(3,4-dihydroxyphenyl)alanine (Gly-Gly-L-dopa)

Into a 250 ml. 1-necked round bottom flask fitted with a magnetic stirrer was placed glycyl-L-3-(3,4-dihydroxyphenyl)alanine (3.0 g., 11.8 mmoles) and N-carbobenzoxyglycine p-nitrophenyl ester (3.98 g., 12.0 mmoles). There was added 50 ml. dimethylformamide and the solution was chilled in ice for 20 minutes and triethylamine (1.195 g., 11.8 mmoles) was added. The solution turned yellow and most of the solids dissolved. Stirring continued at 0° C. for 2 hours and 25° C. for 90 hours.

There was added 1.5 ml. glacial acetic acid and the solution was evaporated in vacuo at 35° C. to remove the dimethylformamide. The residual oil was triturated with anhydrous ethyl ether (five times). The oil was dissolved in an aqueous solution containing 5% by weight sodium bicarbonate, washed with ethyl ether (two times), acidified with 1 M hydrochloric acid and extracted with ethyl acetate (two times). The combined ethyl acetate extract was evaporated to form N-carbobenzoxyglycyl-glycyl-L-3-(3,4-dihydroxyphenyl)alanine as a yellow oil.

A solution of this yellow oil in 130 ml. of 10% by volume acetic acid in 90% by volume methanol was placed into a 500 ml. "pressure" bottle. There was added 1.2 g. of 5% by weight palladium on 95% by weight barium sulfate, and the mixture was hydrogenated for 16 hours at an initial pressure of 42 p.s.i. The product was insoluble in the solvent mixture. The reaction mixture was dissolved on addition of distilled water which was pre-treated with argon for 20 minutes. The mixture was filtered over a methanol moistened pad of Celite and the filtrate evaporated to dryness. The residual oil was dissolved in the argon treated water, filtered and evaporated to dryness. The evaporation was repeated 2 more times and the residual oil was dissolved in a minimum volume of the argon treated water, isopropanol was added until cloudy, and the violet solution was chilled at 0° C. The resultant gelatinous precipitate was collected by filtration, dissolved in warm argon treated water and isopropanol added to the cloud point. It was filtered to remove some gray impurities, more isopropanol added and chilled at 0° C. overnight. The resultant gelatinous precipitate was collected by filtration, and washed with isopropanol and anhydrous ethyl ether. It was dried in vacuo to afford glycyl-glycyl-L-3-(3,4-dihydroxyphenyl) alanine (Gly-Gly-L-dopa), M.P. 170–172° C.

EXAMPLE 72

N,O,O'-tricarbobenzoxy-L-dopa p-nitrophenyl ester

A solution of N,O,O'-tricarbobenzoxy-L-dopa prepared in Example 5 (81.3 g., 0.136 mole) in 700 ml. CH₂Cl₂ was reacted with 22.35 g. (0.16 mole) of p-nitrophenol in the presence of 33.2 g. (0.162 mole) dicyclohexylcarbodiimide at 0° C. for 21 hours. The insoluble dicyclohexylurea formed was filtered off and the filtrate was evaporated to give 116 g. of slightly yellowish oil. On treatment with small amount of ethanol, it became a solid mass. The product was dissolved in CH₂Cl₂ and filtered through a 10 cm. layer of fluorosil to remove some impurities. The filtrate was evaporated and treated with ethanol to give N,O,O'-tricarbobenzoxy-L-dopa p-nitrophenyl ester as crystalline product, M.P. 115.5–117° C.

EXAMPLE 73

L-dopyl-L-dopyl-L-dopa

Fifty ml. of DMF was bubbled with nitrogen gas at 0° for 15 minutes. L-dopa-L-dopa (4.17 g., 0.011 mole) were added followed by 8.8 g. (0.012 mole) of N,O,O'-tricarbobenzoxy-L-dopa p-nitrophenyl ester and 1.71 ml. triethylamine. The reaction mixture was stirred at 0° C. for an additional hour and 24 hours more at room temperature. Acetic acid (2 ml.) was added to the mixture and the slight turbidity that formed was filtered off. Evaporation of the solvent resulted in a heavy syrup which on trituration with several changes of fresh ether gave a white powder. This material was dissolved in 400 ml. ethyl acetate and washed several times with deaerated water, dried over $Na_2SO_4$ and evaporated to give N,O,O'-tricarbobenzoxy-L-dopyl-L-dopyl-L-dopa as a glassy solid. The glassy solid was hydrogenated in 150 ml. of solvent containing methanol, acetic acid and water in a ratio of 10:1:1 parts by volume with 2.7 g. of catalyst (5% by weight Pd on a 95% by weight $BaSO_4$) at 45 p.s.i. for 24 hours. The catalyst was removed by filtration under nitrogen and the filtrate evaporated to a heavy syrup. Upon treatment with 500 ml. peroxide free THF L-dopa-L-dopa-L-dopa was obtained as a slightly pinkish white powder. Reprecipitation of this material from 30 ml. methanol with 700 ml. peroxide free THF gave L-dopyl-L-dopyl-L-dopa as a white amorphous solid.

EXAMPLE 74

N,O,O'-tricarbobenzoxy-L-dopa-dibenzyl-L-glutamate

N,O,O'-tricarbobenzoxy-L-dopa (6.0 g., 0.010 mole) and dibenzyl-L-glutamate hydrochloride (3.64 g., 0.01 mole) were coupled by the procedure of Example 32 in the presence of 2.06 g. of dicyclohexylcarbodiimide and 1.40 ml. triethylamine in 75 ml. of methylene chloride. The reaction mixture was worked up by the procedure of Example 32 to give N,O,O'-tricarbobenzoxy-L-dopa-dibenzyl-L-glutamate, M.P. 115.5–118° C.

EXAMPLE 75

L-dopa-L-glutamic acid

N,O,O' - tricarbobenzoxy-L-dopa-dibenzyl-L-glutamate (4.9 g., 5.39 mm.) in methanol:acetic acid:tetrahydrofuran (75 ml.:5 ml.:25 ml.) was hydrogenated at 48 p.s.i. for 20 hours in the manner of Example 38. The mixture was filtered, evaporated to dryness and crystallized from water-isopropanol. There was obtained L-dopa-L-glutamic acid as white prisms, M.P. 157–159° C.

EXAMPLE 76

Tablets are manufactured utilizing the following composition:

|  | Mg. |
|---|---|
| Glycyl-glycyl-L-3-(3,4-dihydroxyphenyl)alanine | 100 |
| Lactose | 61 |
| Corn starch | 30 |
| Polyvinylpyrrolidone | 4 |
| Talcum | 5 |

The active substance is mixed with the lactose and the corn starch, and, after the addition of a solution of polyvinylpyrrolidone in 40 ml. of ethanol, granulated. The granulate is dried at 30° C., mixed with talcum and pressed to tablets

|  | Mg. |
|---|---|
| Individual weight of one tablet | 200 |
| Active substance content of one tablet | 100 |

EXAMPLE 77

Gelatin capsules are manufactured utilizing the following composition:

|  | Mg. |
|---|---|
| L-dopyl-L-dopyl-L-dopa | 50.0 |
| Mannitol | 98.5 |
| Stearic acid | 1.5 |

The ingredients are homogeneously mixed and filled into interlocking gelatin capsules via a capsule filling machine.

|  | Mg. |
|---|---|
| Individual weight of one capsule | 150 |
| Active substance content of one capsule | 50 |

I claim:

1. A compound selected from the compounds of the formulae:

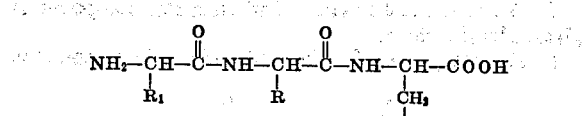

wherein R and R' are

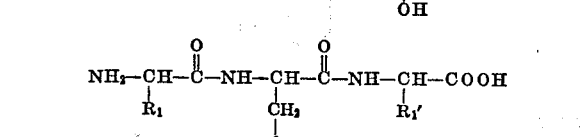

or the source of variation in structure of the α-side chain which differentiates one natural protein occurring α-amino acid from another; $R_1$ and $R_1'$ are

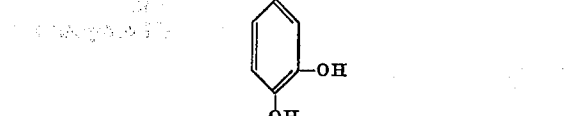

or the source of variation in structure of the α-side chain which differentiates one natural protein occurring α-amino acid from another; and $R_2$ is lower alkyl;

or pharmaceutically acceptable salts thereof.

2. The compound of claim 1 wherein said compound has the formula:

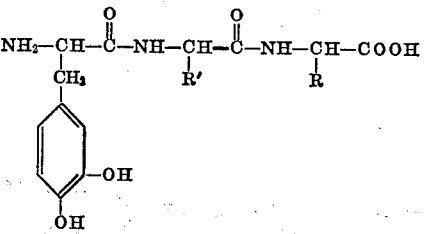

wherein R' and R are as above;
or pharmaceutically acceptable salts thereof.

3. The compound of claim 2 wherein said compound is L - 3 - (3,4 - dihydroxyphenyl) - alanyl - L-(3,4-dihydroxyphenyl-alanyl-L-(3,4-dihydroxyphenyl)-alanine.

4. The compound of claim 2 wherein said compound is L-dopyl-glycyl-glycine.

5. The compound of claim 1 wherein said compound has the formula:

$$NH_2-CH(R_1)-CO-NH-CH(R)-CO-NH-CH(CH_2-C_6H_3(OH)_2)-COOH$$

wherein R and $R_1$ are as above;
or pharmaceutically acceptable salts thereof.

6. The compound of claim 5 wherein said compound is L-propyl-L-dopyl-L-dopa.

7. The compound of claim 6 wherein said compound is glycyl-glycyl-L-dopa.

8. The compound of claim 1 wherein said compound is $$NH_2-CH(R_1)-CO-NH-CH(CH_2-C_6H_3(OH)_2)-NHCO-CH(R_1')-COOH$$

wherein $R_1$ and $R_1'$ are as above;
or pharmaceutically acceptable salts thereof.

9. The compound of claim 1 wherein said compound is glycidyl-L-dopyl-glycine.

10. A compound of the formula:

$$NH_2-CH(CH_2-C_6H_3(OH)_2)-CO-NH-CH_2-CH_2-C_6H_3(OH)_2$$

or pharmaceutically accpetable acid addition salts thereof.

11. The compound of claim 10 wherein said compound is L-3-(3,4-dihydroxyphenyl)-N-(3,4-dihydroxyphenethyl)-alaninamide.

12. An L-L-antipode of a compound of the formula:

$$NH_2-CH(CH_2-C_6H_3(OH)_2)-CO-NH-CH(R)-COOH$$

wherein R is $$-CH_2-C_6H_3(OH)_2, \quad -CH_2-C_6H_3(OR_2)(OH)$$

or the source of variation in structure of the α-side chain which differentiates one natural protein occurring α-amino acid from another; and $R_2$ is lower alkyl;
or pharmaceutically acceptable salts thereof.

13. The compound of claim 12 wherein R is $$-CH_2-C_6H_3(OH)_2$$

14. The compound of claim 13 wherein said compound is L-3-(3,4-dihydroxyphenyl)-alanyl-L-3-(3,4-dihydroxyphenyl)-alanine.

15. The compound of claim 12 wherein R is $$-CH_2-C_6H_3(OR_2)(OH)$$

and $R_2$ is as above.

16. The compound of claim 15 wherein said compound is L-dopyl-3-methoxy-L-tyrosine.

17. The compound of claim 12 wherein R is the source of variation in the structure of the α-side chain which differentiates one natural α-amino acid from another.

18. The compound of claim 17 wherein said compound is L-dopyl-glycine.

19. The compound of claim 17 wherein said compound is L-dopyl-tyrosine.

20. 3-methoxy-L-tyrosyl-L-dopa.

21. L-tyrosyl-L-dopa.

22. α-L-glutamyl-L-dopa.

23. The compound of the formula:

$$R_5-NH-CH(CH_2-C_6H_3(OR_6)(OR_6'))-CO-NH-CH(R')-CO-OR_7$$

wherein $R_2$ is lower alkyl; $R_5$ is a conventional amino protecting group removable by hydrolysis or hydrogenolysis; $R_7$ is lower alkyl, or aryl lower alkyl; R' is $$-CH_2-C_6H_3(OR_6')(OR_6'), \quad -CH_2-C_6H_3(OR_2)(OR_{10})$$

or the source of variation in structure of the α-side chain between different natural protein occurring α-amino acids wherein all free amino and carboxyl groups are protected by a group convertible thereto by hydrolysis or hydrogenolysis and wherein the hydroxy groups may be free or protected by a group convertible thereto by hydrolysis or hydrogenolysis; $R_6$ and $R_6'$ are hydrogen or a group convertible thereto by hydrogenolysis or hydrolysis; $R_{10}$ is hydrogen or a group convertible thereto by hydrogenolysis;
or pharmaceutically acceptable salts thereof.

24. The compound of claim 23 wherein R' is $$-CH_2-C_6H_3(OR_6)(OR_6)$$

and $R_6$ is as above.

25. The compound of claim 24 wherein $R_5$ is arylalkoxycarbonyl.

26. The compound of claim 25 wherein said compound is N-benzyloxycarbonyl-L-3-(3,4-dihydroxyphenyl)-alanyl-L-3-(3,4-dihydroxyphenyl)-alanine benzyl ester.

27. The compound of claim 24 wherein said compound is N,O,O'-tris-benzyloxycarbonyl-L-3-(3,4-dihydroxyphenyl)-alanyl-L-3 - (3,4-dihydroxyphenyl)-alanine benzyl ester.

28. The compound of claim 23 wherein R' is

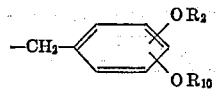

and $R_2$ and $R_{10}$ are as above.

29. The compound of claim 28 wherein said compound is N,O,O'-tris-benzyloxycarbonyl - L-dopyl-3-methoxy-O-carbobenzoxy-L-tyrosine benzyl ester.

30. The compound of claim 23 wherein R' is said source of variation in structure of the α-side chain between different natural α-amino acids wherein all the free amino and carboxyl groups are protected by a group convertible thereto by hydrolysis or hydrogenolysis.

31. The compound of claim 30 wherein $R_5$ and $R_6$ are carbobenzoxy.

32. The compound of claim 30 wherein said compound is N,O,O'-tricarbobenzoxy-L-dopyl-glycine benzyl ester.

33. The compound of claim 30 wherein said compound is N,O,O'-tricarbobenzoxy-L - dopyl-O-carbobenzoxy-L-tyrosine benzyl ester.

34. The compound of the formula:

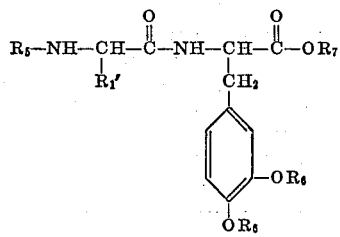

wherein $R_5$ is a conventional amino protecting group removable by hydrogenolysis or hydrolysis; $R_6$ is hydrogen or a group convertible thereto by hydrolysis or hydrogenolysis; $R_7$ is lower alkyl or aryl lower alkyl; $R_1'$ is the source of variation in structure of the α-side chain between different natural protein occurring α-amino acids wherein all free amino and carboxy groups are protected by a group convertible thereto by hydrolysis or hydrogenolysis and where hydroxy groups may be free or protected by a group convertible thereto by hydrolysis or hydrogenolysis, and

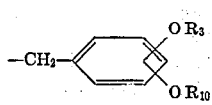

$R_3$ is lower alkyl and $R_{10}$ is hydroxy or a group convertible thereto by hydrogenolysis,
or pharmaceutically acceptable salts thereof.

35. The compound of claim 34 wherein $R_1'$ is

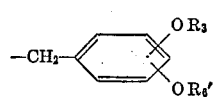

and $R_3$ and $R_6'$ are as above.

36. The compound of claim 35 wherein said compound is N,O - dicarbobenzoxy-3-methoxy-L-tyrosyl-O,O-dicarbobenzoxy-L-dopa benzyl ester.

37. The compound of claim 34 wherein $R_1'$ is said source of variation in structure of the α-side chain between the different natural α-amino acids.

38. The compound of claim 34 wherein $R_5$ and $R_6$ are carbobenzoxy.

39. The compound of claim 38 wherein said compound is N,O - dicarbobenzoxy-L-tyrosyl-O,O'-dicarbobenzoxy-L-dopa-benzyl ester.

40. The compound of claim 38 wherein said compound is N - carbobenzoxy glycyl-O',O-dicarbobenzoxy-L-dopa benzyl ester.

41. The compound of claim 38 wherein said compound is N - carbobenzoxy-γ-benzyl-L-glutamyl-O,O' - dicarbobenzoxy-L-dopa benzyl ester.

42. A compound of the formula:

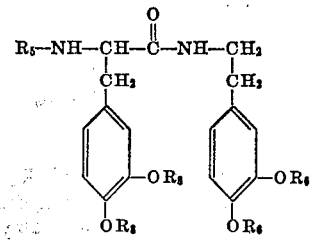

wherein $R_5$ is a conventional amino protecting group which can be removed by hydrogenolysis or hydrolysis; and $R_8$ is hydrogen or a group convertible thereto by hydrolysis or hydrogenolysis, and $R_6$ is hydrogen or a group convertible thereto by hydrolysis.

43. The compound of claim 42 wherein said compound is N-α-benzyloxycarbonyl-L-3-(3,4 - dibenzyloxycarbonyloxyphenyl)-N-3,4 - dimethoxy - phenethyl alaninamide.

44. A compound of the formula:

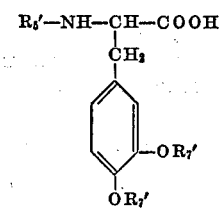

wherein $R_5'$ is aralkoxycarbonyl; $R_7'$ is hydrogen or aralkyloxycarbonyl.

45. The compound of claim 44 wherein said compound is N-benzyloxycarbonyl-L-3-(3,4-dihydroxyphenyl)-alanine.

46. The compound of claim 44 wherein said compound is N-benzyloxycarbonyl-L-3-(3,4 - dihydroxyphenyl)-alanine.

47. A compound of the formula:

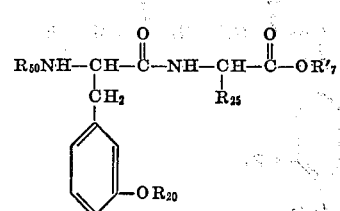

wherein $R_{50}$ is hydrogen or a group convertible thereto by hydrolysis; $R_2$ is lower alkyl; $R_7'$ is hydrogen or lower alkyl; $R_{20}$ and $R_{26}$ are hydrogen or a group convertible thereto by hydrolysis; $R_{25}$ is

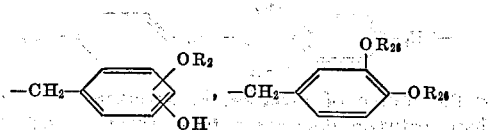

or the source of variation in structure of the α-side chain between different natural protein occurring α-amino acids wherein all hydroxy, carboxy and amino groups are free or protected by a group convertible thereto by hydrolysis; with the proviso that one of $R_7'$, $R_{20}$, $R_{50}$ and $R_{26}$ is other than hydrogen; or pharmaceutically acceptable salts thereof; said compound having a free carboxy or free amino group.

48. The compound of the formula:

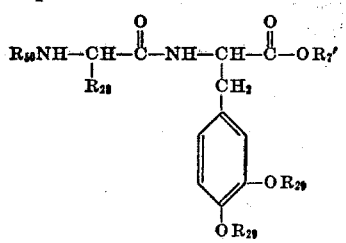

wherein R₇' is hydrogen or lower alkyl; R₅₀ is hydrogen or a group convertible thereto by hydrolysis; R₃ is lower alkyl; R₁ is hydrogen or lower alkyl; R₂₉ is hydrogen or a group convertible thereto by hydrolysis; R₂₈ is

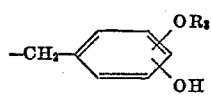

or the source of variation in structure of the α-side chain between different natural essential α-amino acids wherein all amino, carboxy and hydroxy groups are free or protected by a group removable by hydrolysis with the proviso that one of R₂₉, R₅₀ and R₇' is other than hydrogen: or pharmaceutically acceptable salts thereof, said compound having a free carboxy or free amino group.

49. A compound of the formula:

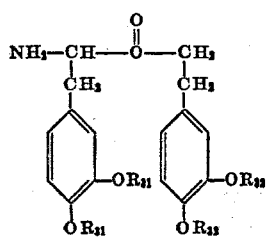

wherein R₃₁ and R₃₂ are hydrogen or a group convertible thereto by hydrolysis with one of R₃₁ and R₃₂ being other than hydrogen.

50. A compound of the formula:

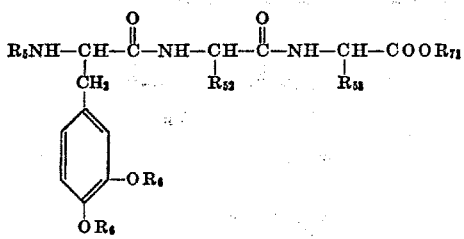

wherein R₂ is lower alkyl; R₅ is hydrogen or an amino protecting group which can be removed by hydrolysis or hydrogenolysis; R₆ is hydrogen or a group convertible thereto by hydrolysis; R₇₁ is hydrogen, lower alkyl or aryl lower alkyl; R₅₂ and R₅₃ are

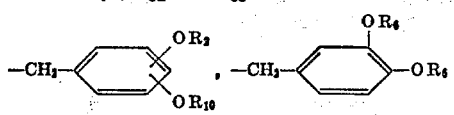

or the source of variation in structure of the α-side chain between different natural protein occurring α-amino acids wherein all free amino acid carboxy groups are protected by a group convertible thereto by hydrolysis or hydrogenolysis; and where hydroxy groups may be free or protected by a group convertible thereto by hydrolysis or hydrogenolysis; R₁₀ is hydrogen or a group convertible thereto by hydrogenolysis; and R₂ is lower alkyl.
or pharmaceutically acceptable salts thereof wherein said compound has at least one protected carboxy, hydroxy or amino group.

51. The compound of claim 50 wherein said compound is N,O',O'-tricarbobenzoxy-L-dopyl-L-dopyl-L-dopa.

52. The compound of claim 50 wherein said compound is N,O',O'-trisbenzyloxycarbonyl - L - 3(3,4-dihydroxyphenyl)-alanyl-glycyl-glycine.

53. A compound of the formula:

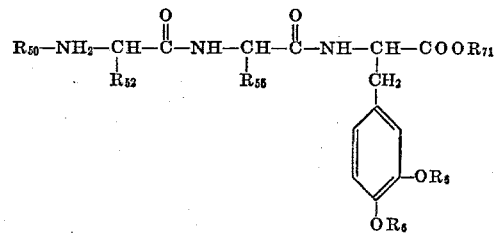

wherein R₂ is lower alkyl; R₅ is hydrogen or an amino protecting group which can be removed by hydrogenolysis or hydrolysis; R₆ is hydrogen or a group convertible thereto by hydrolysis or hydrogenolysis; R₇₁ is hydrogen, lower alkyl or aryl lower alkyl; R₅₅ is

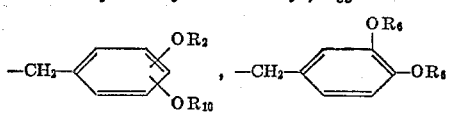

or the source of variation in structure of the α-side chain between different natural protein occurring α-amino acids wherein all free amino acid carboxy groups are protected by a group convertible thereto by hydrolysis or hydrogenolysis and where hydroxy groups may be free or protected by a group convertible thereto by hydrolysis or hydrogenolysis; R₁₀ is hydrogen or a group convertible thereto by hydrogenolysis; R₅₂ is

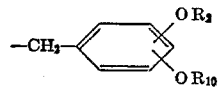

or the source of variation in structure of the α-side chain between different natural protein occurring α-amino acids wherein all free amino and carboxy groups are protected by a group convertible thereto by hydrolysis or hydrogenolysis and where the hydroxy groups may be free or protected by a group convertible thereto by hydrolysis or hydrogenolysis;
or pharmaceutically acceptable salts thereof with the proviso that the compound has at least one protected amino, carboxy or hydroxy group.

54. The compound of claim 53 wherein said compound is N - carbobenzoxyglycyl-glycyl-L-3-(3,4-dihydroxyphenyl)-alanine.

55. A compound of the formula:

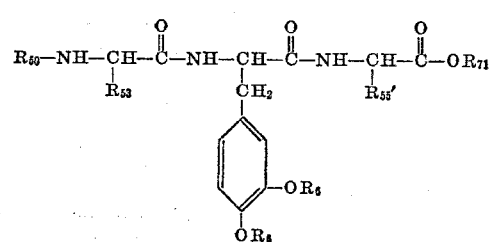

wherein R₂ is lower alkyl; R₅₀ is hydrogen or an amino protecting group which can be removed by hydrolysis or hydrogenolysis; R₇₁ is hydrogen, lower alkyl or aryl lower alkoxy; R₅₅' and R₅₃ are

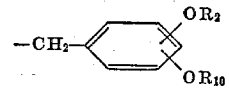

or the source of variation between different natural protein occurring α-amino acids wherein all free amino and carboxy groups are protected by a group convertible thereto by hydrolysis or hydrogenolysis and where the hydroxy groups may be free or protected by a group convertible thereto by hydrolysis or hydrogenolysis; and $R_{10}$ is hydrogen or a group converticle thereto by hydrolysis;

and pharmaceutically acceptable salts thereof wherein the compound has at least one protected carboxy, hydroxy or amino group.

56. The compound of claim 55 wherein said compound is N-carbobenzoxy-glycyl - L - 3 - (3,4-dihydroxyphenyl)-alanyl-glycine.

57. L-pyroglutamyl-L-dopa.

References Cited
UNITED STATES PATENTS

| | | | |
|---|---|---|---|
| 3,676,482 | 7/1972 | Hinkley et al. | 260—519 |
| 3,665,032 | 5/1972 | Burch et al. | 260—519 |
| 3,626,059 | 12/1971 | Hegedus et al. | 260—519 |
| 3,592,844 | 7/1971 | Reinhold et al. | 260—519 |
| 3,454,629 | 7/1969 | Daeniker | 260—519 |
| 3,366,666 | 1/1968 | Rutschmann et al. | 260—519 |
| 3,132,176 | 5/1964 | Bollinger et al. | 260—519 |

OTHER REFERENCES

Calne et al.: Nature 226, 21 (1970).
Calne et al.: Brit. J. Pharmacol. 37, 57 (1969).
Sandler et al.: Prog. Med. Chem., 6, 200 (1969).

LEWIS GOTTS, Primary Examiner

R. J. SUYAT, Assistant Examiner

U.S. Cl. X.R.

260—519; 424—177

UNITED STATES PATENT AND TRADEMARK OFFICE
CERTIFICATE OF CORRECTION

PATENT NO. : 3,803,120
DATED : April 9, 1974
INVENTOR(S) : Arthur Martin Felix

It is certified that error appears in the above-identified patent and that said Letters Patent are hereby corrected as shown below:

Col. 34, claim 1, first formula "-COO" should be: -COOH-

Col. 34, line 75 "droxyphenyl-" should be: droxyphenyl)-

Col. 35, line 18, "L-propyl" should be: L-prolyl

Col. 35, line 37, "glycydyl" should be: glycyl

Col. 36, line 65, formula should be; 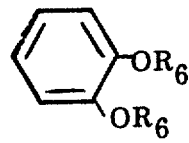

Col. 38, line 42, "N-" should be: N,O,O'-tris-

Col. 41, line 3, "converticle" should be: convertible

Col. 40, line 9, "-$NH_2$-" should be: -NH-

Signed and Sealed this

Seventeenth Day of August 1976

[SEAL]

Attest:

RUTH C. MASON
*Attesting Officer*

C. MARSHALL DANN
*Commissioner of Patents and Trademarks*